(12) United States Patent
Hardy et al.

(10) Patent No.: US 9,172,605 B2
(45) Date of Patent: Oct. 27, 2015

(54) CLOUD DEVICE IDENTIFICATION AND AUTHENTICATION

(71) Applicant: Ubiquiti Networks, Inc., San Jose, CA (US)

(72) Inventors: Matthew A. Hardy, Atlanta, GA (US); Randall W. Frei, San Jose, CA (US); Jonathan P. Bauer, Cincinnati, OH (US); Mahesh Paolini-Subramanya, New York, NY (US)

(73) Assignee: Ubiquiti Networks, Inc., San Jose, CA (US)

( * ) Notice: Subject to any disclaimer, the term of this patent is extended or adjusted under 35 U.S.C. 154(b) by 0 days.

(21) Appl. No.: 14/639,909

(22) Filed: Mar. 5, 2015

(65) Prior Publication Data

US 2015/0256391 A1    Sep. 10, 2015

Related U.S. Application Data

(60) Provisional application No. 61/970,763, filed on Mar. 26, 2014, provisional application No. 61/949,918, filed on Mar. 7, 2014.

(51) Int. Cl.
*G06F 15/177*   (2006.01)
*H04L 12/24*    (2006.01)
*H04W 24/02*    (2009.01)
*H04L 29/08*    (2006.01)

(52) U.S. Cl.
CPC ............ *H04L 41/0806* (2013.01); *H04L 67/10* (2013.01); *H04W 24/02* (2013.01)

(58) Field of Classification Search
USPC .......................... 709/220, 221, 222, 227, 229
See application file for complete search history.

(56) References Cited

U.S. PATENT DOCUMENTS

| | | |
|---|---|---|
| 3,155,975 A | 11/1964 | Chatelain |
| 3,633,208 A | 1/1972 | Ajioka |
| 3,696,433 A | 10/1972 | Killion et al. |
| 3,739,392 A | 6/1973 | Ross et al. |
| 3,825,874 A | 7/1974 | Peverill |
| 4,613,868 A | 9/1986 | Weiss |
| 4,658,262 A | 4/1987 | Duhamel |
| 4,757,324 A | 7/1988 | Dhanjal |
| 4,758,842 A | 7/1988 | Linhardt et al. |
| 4,973,953 A | 11/1990 | Shimokawa et al. |

(Continued)

FOREIGN PATENT DOCUMENTS

| | | |
|---|---|---|
| GB | 2313957 A | 12/1997 |
| JP | 2002299940 A | 10/2002 |

(Continued)

OTHER PUBLICATIONS

Sanford, John; U.S. Appl. No. 14/170,507 entitled "Coaxial RF Dual-Polarized Waveguide Filter and Method," filed Jan. 31, 2014.

(Continued)

*Primary Examiner* — Liangche A Wang
(74) *Attorney, Agent, or Firm* — Shay Glenn LLP

(57) ABSTRACT

Methods and apparatuses for authentication and/or provisioning of wireless network devices, and in particular, methods and apparatuses for authentication and/or provisioning of wireless network devices that are communicating with and may be monitored and/or controlled by a remote (e.g., cloud) server.

19 Claims, 13 Drawing Sheets

(56) References Cited

U.S. PATENT DOCUMENTS

| | | |
|---|---|---|
| 4,992,866 A | 2/1991 | Morgan |
| 5,131,006 A | 7/1992 | Kamerman et al. |
| 5,151,920 A | 9/1992 | Haagh et al. |
| 5,191,349 A | 3/1993 | Dinsmore et al. |
| 5,295,154 A | 3/1994 | Meier et al. |
| 5,303,413 A | 4/1994 | Braegas |
| 5,307,515 A | 4/1994 | Kuo et al. |
| 5,339,455 A | 8/1994 | Vogt et al. |
| 5,406,260 A | 4/1995 | Cummings et al. |
| 5,416,797 A | 5/1995 | Gilhousen et al. |
| 5,422,887 A | 6/1995 | Diepstraten et al. |
| 5,428,636 A | 6/1995 | Meier |
| 5,503,566 A | 4/1996 | Wang |
| 5,504,746 A | 4/1996 | Meier |
| 5,510,975 A | 4/1996 | Ziegler |
| 5,523,768 A | 6/1996 | Hemmie et al. |
| 5,546,397 A | 8/1996 | Mahany |
| 5,564,093 A | 10/1996 | Matsumoto |
| 5,608,413 A | 3/1997 | Macdonald |
| 5,621,662 A | 4/1997 | Humphries et al. |
| 5,661,494 A | 8/1997 | Bondyopadhyay |
| 5,666,126 A | 9/1997 | Lange |
| 5,706,428 A | 1/1998 | Boer et al. |
| 5,734,350 A | 3/1998 | Deming et al. |
| 5,740,366 A | 4/1998 | Mahany et al. |
| 5,758,296 A | 5/1998 | Nakamura |
| 5,782,656 A | 7/1998 | Zell et al. |
| 5,805,111 A | 9/1998 | Brettner et al. |
| 5,844,893 A | 12/1998 | Gollnick et al. |
| 5,872,594 A | 2/1999 | Thompson |
| 5,936,542 A | 8/1999 | Kleinrock et al. |
| 5,936,584 A | 8/1999 | Lawrence et al. |
| 5,940,771 A | 8/1999 | Gollnick et al. |
| 6,036,539 A | 3/2000 | Rigby et al. |
| 6,045,402 A | 4/2000 | Embo et al. |
| 6,067,053 A | 5/2000 | Runyon et al. |
| 6,113,431 A | 9/2000 | Wong |
| 6,124,830 A | 9/2000 | Yuanzhu |
| 6,127,987 A | 10/2000 | Maruyama et al. |
| 6,130,892 A | 10/2000 | Short et al. |
| 6,192,282 B1 | 2/2001 | Smith et al. |
| 6,194,992 B1 | 2/2001 | Short et al. |
| 6,206,724 B1 | 3/2001 | Leung |
| 6,208,310 B1 | 3/2001 | Suleiman et al. |
| 6,219,005 B1 | 4/2001 | Szafranek |
| 6,252,559 B1 | 6/2001 | Donn |
| 6,275,922 B1 | 8/2001 | Bertsch |
| 6,313,798 B1 | 11/2001 | Bancroft et al. |
| 6,320,553 B1 | 11/2001 | Ergene |
| 6,326,922 B1 | 12/2001 | Hegendoerfer |
| 6,334,057 B1 | 12/2001 | Malmgren et al. |
| 6,337,990 B1 | 1/2002 | Koshino |
| 6,359,647 B1 | 3/2002 | Sengupta et al. |
| 6,362,783 B1 | 3/2002 | Sugiura et al. |
| 6,374,311 B1 | 4/2002 | Mahany et al. |
| 6,386,913 B1 | 5/2002 | Mohammad et al. |
| 6,386,914 B1 | 5/2002 | Collins et al. |
| 6,411,258 B1 | 6/2002 | Ho |
| 6,425,783 B1 | 7/2002 | Touboul |
| 6,429,827 B1 | 8/2002 | Hsueh et al. |
| 6,462,710 B1 | 10/2002 | Carson et al. |
| 6,501,377 B2 | 12/2002 | Ebata et al. |
| 6,524,119 B2 | 2/2003 | Kato et al. |
| 6,529,234 B2 | 3/2003 | Urisaka et al. |
| 6,535,793 B2 | 3/2003 | Allard |
| 6,563,786 B1 | 5/2003 | Van Nee |
| 6,567,482 B1 | 5/2003 | Popovic |
| 6,593,892 B2 | 7/2003 | Honda et al. |
| 6,597,393 B2 | 7/2003 | Kato et al. |
| 6,618,017 B1 | 9/2003 | Ryken et al. |
| 6,636,894 B1 | 10/2003 | Short et al. |
| 6,643,496 B1 | 11/2003 | Shimoyama et al. |
| 6,665,004 B1 | 12/2003 | Paff |
| 6,665,536 B1 | 12/2003 | Mahany |
| 6,679,728 B1 | 1/2004 | Huang et al. |
| 6,697,415 B1 | 2/2004 | Mahany |
| 6,714,559 B1 | 3/2004 | Meier |
| 6,738,582 B1 | 5/2004 | Moshe et al. |
| 6,759,957 B2 | 7/2004 | Murakami et al. |
| 6,789,110 B1 | 9/2004 | Short et al. |
| 6,795,852 B1 | 9/2004 | Kleinrock et al. |
| 6,808,414 B2 | 10/2004 | Spiegel et al. |
| 6,810,426 B2 | 10/2004 | Mysore et al. |
| 6,844,862 B1 | 1/2005 | Cencich et al. |
| 6,845,297 B2 | 1/2005 | Allard |
| 6,857,009 B1 | 2/2005 | Ferreria et al. |
| 6,865,169 B1 | 3/2005 | Quayle et al. |
| 6,868,399 B1 | 3/2005 | Short et al. |
| 6,945,817 B2 | 9/2005 | Miyazaki et al. |
| 6,954,859 B1 | 10/2005 | Simerly et al. |
| 6,968,173 B2 | 11/2005 | Cowley |
| 6,970,680 B1 | 11/2005 | Tomoe |
| 6,970,751 B2 | 11/2005 | Gonzales et al. |
| 6,977,585 B2 | 12/2005 | Falk et al. |
| 6,997,753 B2 | 2/2006 | Broomall et al. |
| 7,020,082 B2 | 3/2006 | Bhagavath et al. |
| 7,086,898 B2 | 8/2006 | Johnsen et al. |
| 7,088,727 B1 | 8/2006 | Short et al. |
| 7,095,321 B2 | 8/2006 | Primm et al. |
| 7,117,043 B1 | 10/2006 | Frederick et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,252,555 B2 | 8/2007 | Moessinger |
| 7,254,191 B2 | 8/2007 | Sugar et al. |
| 7,286,095 B2 | 10/2007 | Parsche et al. |
| 7,295,812 B2 | 11/2007 | Haapoja et al. |
| 7,319,477 B2 | 1/2008 | Katz |
| 7,353,114 B1 | 4/2008 | Rohlf et al. |
| 7,386,002 B2 | 6/2008 | Meier |
| 7,413,474 B2 | 8/2008 | Liu et al. |
| 7,430,442 B2 | 9/2008 | He et al. |
| 7,457,646 B2 | 11/2008 | Mahany et al. |
| 7,483,984 B1 | 1/2009 | Jonker et al. |
| 7,526,539 B1 | 4/2009 | Hsu |
| 7,555,658 B2 | 6/2009 | Vahid et al. |
| 7,584,020 B2 | 9/2009 | Bruemmer et al. |
| 7,587,260 B2 | 9/2009 | Bruemmer et al. |
| 7,636,559 B2 | 12/2009 | Magnusen et al. |
| 7,668,621 B2 | 2/2010 | Bruemmer |
| 7,683,940 B2 | 3/2010 | Fleming |
| 7,696,940 B1 | 4/2010 | Macdonald |
| 7,710,940 B2 | 5/2010 | Van Der Wal et al. |
| 7,715,800 B2 | 5/2010 | Sinha |
| 7,733,835 B2 | 6/2010 | Sammour et al. |
| 7,739,383 B1 | 6/2010 | Short et al. |
| 7,752,334 B2 | 7/2010 | Paunikar et al. |
| 7,783,390 B2 | 8/2010 | Miller |
| 7,791,466 B2 | 9/2010 | Agarwalla et al. |
| 7,801,644 B2 | 9/2010 | Bruemmer et al. |
| 7,826,426 B1 | 11/2010 | Bharghavan et al. |
| 7,839,926 B1 | 11/2010 | Metzger et al. |
| 7,848,263 B2 | 12/2010 | Chhabra |
| 7,865,252 B2 | 1/2011 | Clayton |
| 7,934,952 B2 | 5/2011 | Pera |
| 7,974,738 B2 | 7/2011 | Bruemmer et al. |
| 8,013,732 B2 | 9/2011 | Petite et al. |
| 8,031,650 B2 | 10/2011 | Petite et al. |
| 8,042,048 B2 | 10/2011 | Wilson et al. |
| 8,060,582 B2 | 11/2011 | Bliss et al. |
| 8,073,564 B2 | 12/2011 | Bruemmer et al. |
| 8,077,113 B2 | 12/2011 | Syed et al. |
| 8,154,398 B2 | 4/2012 | Rolf et al. |
| 8,165,041 B2 | 4/2012 | Wang et al. |
| 8,184,061 B2 | 5/2012 | Sanford |
| 8,184,064 B2 | 5/2012 | Sanford |
| 8,190,708 B1 | 5/2012 | Short et al. |
| 8,219,059 B2 | 7/2012 | Pera et al. |
| 8,270,767 B2 | 9/2012 | Park |
| 8,306,634 B2 | 11/2012 | Nguyen et al. |
| 8,310,335 B2 | 11/2012 | Sivakkolundhu |
| 8,335,272 B2 | 12/2012 | Roberts |
| 8,350,697 B2 | 1/2013 | Trundle et al. |

(56) References Cited

U.S. PATENT DOCUMENTS

| | | |
|---|---|---|
| 8,385,869 B2 | 2/2013 | Feenaghty et al. |
| 8,390,684 B2 | 3/2013 | Piran et al. |
| 8,400,997 B2 | 3/2013 | Pera et al. |
| 8,421,700 B2 | 4/2013 | Sanford |
| 8,421,704 B2 | 4/2013 | Sanford |
| 8,429,435 B1 | 4/2013 | Clayton et al. |
| 8,466,847 B2 | 6/2013 | Pera et al. |
| 8,467,759 B2 | 6/2013 | Pera et al. |
| 8,478,450 B2 | 7/2013 | Lu et al. |
| 8,483,188 B2 | 7/2013 | Walton et al. |
| 8,489,065 B2 | 7/2013 | Green et al. |
| 8,493,279 B2 | 7/2013 | Pera et al. |
| 8,619,136 B2 | 12/2013 | Howarter et al. |
| 8,698,684 B2 | 4/2014 | Sanford |
| 8,698,687 B2 | 4/2014 | Pera et al. |
| 8,736,503 B2 | 5/2014 | Zaghloul et al. |
| 8,761,142 B2 | 6/2014 | Dayanandan et al. |
| 8,836,601 B2 | 9/2014 | Sanford et al. |
| 8,855,730 B2 | 10/2014 | Sanford |
| 8,879,574 B2 | 11/2014 | Dayanandan et al. |
| 8,880,204 B2 | 11/2014 | Frei et al. |
| 8,902,120 B2 | 12/2014 | Sanford |
| 2001/0046258 A1 | 11/2001 | Wise et al. |
| 2002/0015393 A1 | 2/2002 | Pan et al. |
| 2002/0105475 A1 | 8/2002 | Overton et al. |
| 2002/0113744 A1 | 8/2002 | Strickland |
| 2002/0142780 A1 | 10/2002 | Airy et al. |
| 2002/0187760 A1 | 12/2002 | Krishmar-Junker et al. |
| 2003/0032398 A1 | 2/2003 | Harris |
| 2003/0098812 A1 | 5/2003 | Ying et al. |
| 2003/0169522 A1 | 9/2003 | Schofield et al. |
| 2003/0189516 A1 | 10/2003 | Olson |
| 2003/0207669 A1 | 11/2003 | Kroeger |
| 2003/0217136 A1 | 11/2003 | Cho et al. |
| 2003/0224801 A1 | 12/2003 | Lovberg et al. |
| 2003/0233660 A1 | 12/2003 | Slemmer et al. |
| 2004/0133913 A1 | 7/2004 | Benveniste |
| 2004/0151126 A1 | 8/2004 | Matsubara |
| 2004/0209521 A1 | 10/2004 | Cooper et al. |
| 2004/0233107 A1 | 11/2004 | Popov et al. |
| 2005/0048835 A1 | 3/2005 | Clark |
| 2005/0048971 A1 | 3/2005 | Findikli et al. |
| 2005/0057700 A1 | 3/2005 | Lim et al. |
| 2005/0136880 A1 | 6/2005 | Subasic et al. |
| 2006/0050677 A1 | 3/2006 | Schafer |
| 2006/0057986 A1 | 3/2006 | Wakui et al. |
| 2006/0079230 A1 | 4/2006 | Russell |
| 2006/0090923 A1 | 5/2006 | Fetterolf et al. |
| 2006/0116170 A1 | 6/2006 | Brahmbhatt et al. |
| 2006/0128371 A1 | 6/2006 | Dillon et al. |
| 2006/0253205 A1 | 11/2006 | Gardiner |
| 2006/0258315 A1 | 11/2006 | Fein et al. |
| 2006/0281433 A1 | 12/2006 | Yang et al. |
| 2007/0042732 A1 | 2/2007 | Kang et al. |
| 2007/0053362 A1 | 3/2007 | Garg |
| 2007/0057860 A1 | 3/2007 | Jaffer et al. |
| 2007/0075909 A1 | 4/2007 | Flynn et al. |
| 2007/0086424 A1 | 4/2007 | Calcev et al. |
| 2007/0188615 A1 | 8/2007 | Beniyama et al. |
| 2007/0205847 A1 | 9/2007 | Kushta et al. |
| 2007/0238419 A1 | 10/2007 | Dubois et al. |
| 2007/0274249 A1 | 11/2007 | Hulbert et al. |
| 2007/0282944 A1 | 12/2007 | Odaka et al. |
| 2008/0009967 A1 | 1/2008 | Bruemmer |
| 2008/0036657 A1 | 2/2008 | Oomuro |
| 2008/0048927 A1 | 2/2008 | Hoshi |
| 2008/0051053 A1 | 2/2008 | Fedan |
| 2008/0056125 A1 | 3/2008 | Kneckt et al. |
| 2008/0080553 A1 | 4/2008 | Hasty et al. |
| 2008/0113552 A1 | 5/2008 | Casperson et al. |
| 2008/0125129 A1 | 5/2008 | Lee |
| 2008/0136713 A1 | 6/2008 | Fu et al. |
| 2008/0151801 A1 | 6/2008 | Mizuta |
| 2008/0159239 A1 | 7/2008 | Odlyzko et al. |
| 2008/0162048 A1 | 7/2008 | Yang et al. |
| 2008/0165731 A1 | 7/2008 | Zellner |
| 2008/0165735 A1 | 7/2008 | Chen et al. |
| 2008/0175265 A1 | 7/2008 | Yonge et al. |
| 2008/0192644 A1 | 8/2008 | Utsunomiya et al. |
| 2008/0211929 A1 | 9/2008 | Uchihara |
| 2008/0212612 A1 | 9/2008 | Singh et al. |
| 2008/0219198 A1 | 9/2008 | Honkasalo et al. |
| 2008/0224938 A1 | 9/2008 | Udagawa et al. |
| 2008/0231538 A1 | 9/2008 | Inque et al. |
| 2008/0240107 A1 | 10/2008 | Parekh et al. |
| 2008/0291873 A1 | 11/2008 | Benveniste |
| 2008/0309535 A1 | 12/2008 | Le Guillou |
| 2009/0003374 A1 | 1/2009 | Morrissey et al. |
| 2009/0070477 A1 | 3/2009 | Baum et al. |
| 2009/0096689 A1 | 4/2009 | Krajicek |
| 2009/0157844 A1 | 6/2009 | Fionda et al. |
| 2009/0174622 A1 | 7/2009 | Kanou |
| 2009/0191751 A1 | 7/2009 | Barsigian et al. |
| 2009/0195467 A1 | 8/2009 | Vassilakis et al. |
| 2009/0234499 A1 | 9/2009 | Nielsen et al. |
| 2009/0237314 A1 | 9/2009 | Lalezari |
| 2009/0240791 A1 | 9/2009 | Sakurai et al. |
| 2009/0245227 A1 | 10/2009 | Chin et al. |
| 2009/0252127 A1 | 10/2009 | Rangarajan et al. |
| 2009/0257239 A1 | 10/2009 | Burton |
| 2009/0307255 A1 | 12/2009 | Park |
| 2009/0310721 A1 | 12/2009 | Redfern et al. |
| 2010/0007561 A1 | 1/2010 | Bucca et al. |
| 2010/0013729 A1 | 1/2010 | Harel et al. |
| 2010/0023865 A1 | 1/2010 | Fulker et al. |
| 2010/0039979 A1 | 2/2010 | Takase et al. |
| 2010/0053022 A1 | 3/2010 | Mak et al. |
| 2010/0097473 A1 | 4/2010 | Park et al. |
| 2010/0115415 A1 | 5/2010 | Hickey |
| 2010/0152897 A1 | 6/2010 | Muller |
| 2010/0177012 A1 | 7/2010 | Morrow |
| 2010/0218004 A1 | 8/2010 | Cousy |
| 2010/0232324 A1 | 9/2010 | Radunovic et al. |
| 2010/0232400 A1 | 9/2010 | Patil et al. |
| 2010/0280635 A1 | 11/2010 | Cohn et al. |
| 2010/0280637 A1 | 11/2010 | Cohn et al. |
| 2010/0295736 A1 | 11/2010 | Su |
| 2010/0298957 A1 | 11/2010 | Sanchez Rocha et al. |
| 2010/0306320 A1 | 12/2010 | Leppanen et al. |
| 2011/0013601 A1 | 1/2011 | Cerasa et al. |
| 2011/0053536 A1 | 3/2011 | Friedmann |
| 2011/0058036 A1 | 3/2011 | Metzger et al. |
| 2011/0090129 A1 | 4/2011 | Weily et al. |
| 2011/0115816 A1 | 5/2011 | Brackney |
| 2011/0150401 A1 | 6/2011 | Furuyama |
| 2011/0185011 A1 | 7/2011 | Shuman et al. |
| 2011/0211559 A1 | 9/2011 | Lim et al. |
| 2011/0258678 A1 | 10/2011 | Cowling et al. |
| 2011/0260934 A1 | 10/2011 | Ilno et al. |
| 2011/0294342 A1 | 12/2011 | DeBock et al. |
| 2012/0019418 A1 | 1/2012 | Wong et al. |
| 2012/0096271 A1 | 4/2012 | Ramarathinam et al. |
| 2012/0127977 A1 | 5/2012 | Copeland et al. |
| 2012/0130513 A1 | 5/2012 | Hao et al. |
| 2012/0158161 A1 | 6/2012 | Cohn et al. |
| 2012/0176608 A1 | 7/2012 | McCown |
| 2012/0188892 A1* | 7/2012 | Demilie et al. ............... 370/252 |
| 2012/0210147 A1 | 8/2012 | Musti et al. |
| 2012/0213086 A1 | 8/2012 | Matsuura |
| 2012/0226366 A1 | 9/2012 | Lee et al. |
| 2012/0257862 A1 | 10/2012 | Deel et al. |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0035774 A1 | 2/2013 | Warren et al. |
| 2013/0051286 A1 | 2/2013 | Schultz et al. |
| 2013/0067564 A1* | 3/2013 | Fok Ah Chuen et al. ....... 726/17 |
| 2013/0077606 A1 | 3/2013 | Wu et al. |
| 2013/0107869 A1 | 5/2013 | Abraham et al. |
| 2013/0129091 A1 | 5/2013 | Kang et al. |
| 2013/0154894 A1 | 6/2013 | Caimi et al. |
| 2013/0201316 A1* | 8/2013 | Binder et al. ................... 348/77 |
| 2013/0252567 A1 | 9/2013 | Pera et al. |

(56) References Cited

U.S. PATENT DOCUMENTS

| | | | |
|---|---|---|---|
| 2013/0271337 | A1 | 10/2013 | Lee et al. |
| 2013/0333005 | A1 | 12/2013 | Kim et al. |
| 2014/0005809 | A1* | 1/2014 | Frei et al. ............ 700/90 |
| 2014/0005810 | A1 | 1/2014 | Frei et al. |
| 2014/0005851 | A1 | 1/2014 | Frei et al. |
| 2014/0006506 | A1 | 1/2014 | Frei et al. |
| 2014/0006552 | A1 | 1/2014 | Frei et al. |
| 2014/0006605 | A1 | 1/2014 | Frei et al. |
| 2014/0022918 | A1 | 1/2014 | Guo et al. |
| 2014/0115354 | A1* | 4/2014 | Jabbaz et al. ............ 713/310 |
| 2014/0118203 | A1 | 5/2014 | Sanford |
| 2014/0140228 | A1 | 5/2014 | Dayanandan et al. |
| 2014/0140232 | A1 | 5/2014 | Dayanandan et al. |
| 2014/0143374 | A1 | 5/2014 | Huang et al. |
| 2014/0218248 | A1 | 8/2014 | Schulz et al. |
| 2014/0219142 | A1 | 8/2014 | Schulz et al. |
| 2014/0220903 | A1 | 8/2014 | Schulz et al. |
| 2014/0225782 | A1 | 8/2014 | Sanford |
| 2014/0225788 | A1 | 8/2014 | Schulz et al. |
| 2014/0225802 | A1 | 8/2014 | Huerta et al. |
| 2014/0225803 | A1 | 8/2014 | Huerta et al. |
| 2014/0245160 | A1 | 8/2014 | Bauer et al. |
| 2014/0258742 | A1 | 9/2014 | Chien et al. |
| 2014/0274177 | A1 | 9/2014 | Carbajal |
| 2014/0329522 | A1 | 11/2014 | Dayanandan et al. |
| 2015/0002357 | A1 | 1/2015 | Sanford et al. |
| 2015/0105038 | A1 | 4/2015 | Lascari et al. |

FOREIGN PATENT DOCUMENTS

| | | |
|---|---|---|
| KR | 20020095556 | 12/2002 |
| KR | 10-2008-0079357 | 9/2008 |
| KR | 10-2013-0141939 | 12/2013 |
| WO | WO98/40990 A1 | 9/1998 |
| WO | WO99/34477 A1 | 7/1999 |
| WO | WO01/31855 A2 | 5/2001 |
| WO | WO01/31886 A2 | 5/2001 |
| WO | WO01/86877 A2 | 11/2001 |
| WO | WO03/023987 A1 | 3/2003 |
| WO | WO2006/044783 A2 | 4/2006 |
| WO | WO2008/042804 A2 | 4/2008 |
| WO | WO2009/146342 A1 | 12/2009 |
| WO | WO2010/049113 A1 | 5/2010 |
| WO | WO2011/005710 A2 | 1/2011 |

OTHER PUBLICATIONS

Pera et al.; U.S. Appl. No. 14/639,892 entitled "Power receptacle wireless access point devices for networked living and work spaces," filed Mar. 5, 2015.

Pera et al.; U.S. Appl. No. 14/639,905 entitled "Wall-mounted interactive sensing and audio-visual devices for networked living and work spaces," filed Mar. 5, 2015.

Dayanandan et al.; U.S. Appl. No. 14/659,397 entitled "Methods of operating an access point using a plurality of directional beams," filed Mar. 16, 2015.

Ashtaiwi et al.; Utilizing IEEE 802.11n to enhance QoS support in wireless mesh networks; (LCN 2008) 33rd IEEE Conf. on Loacal Computer Networks; pp. 689-696; Oct. 14-17, 2008.

Cisco; Cisco NX-OS Software: Business-Critical Cross-Platform Data Center OS (white paper); retrieved from the Internet on Jul. 9, 2014 (http://www.cisco.com/c/en/us/products/collateral/switches/nexus-7000-series-switches/white_paper_c11-622511.pdf); 14 pgs.; © 2010.

El-Basioni et al.; Smart home design using wireless sensor network and biometric technologies; International Journal of Application or Innovation in Engineering & Management; 2(3); pp. 413-429; Mar. 2013.

Hajlaoui et al.; A frame aggregation scheduler for QoS-sensitive applications in IEEE802.11n WLANs; (ICCIT) Int. Conf. on Communications and Information Tech.; pp. 221-226; Jun. 26-28, 2012.

Iijima et al.; NETCONF over WebSocket; 82nd IETF Meeting, Taipei, Taiwan; retrived from the internet (http://www.ietf.org/proceedings/82/slides/netconf-1.pdf); 9 pgs.; Nov. 13-18, 2011.

Internet Engineering Task Force (IETF); The WebSocket Protocol; 72 pgs.; Dec. 2011; retrieved from the internet on Mar. 6, 2014 from https://tools.ietf.org/html/rfc6455.

Kishk et al.; Conical dielectric resonator antennas for wide-band applications; IEEE Trans.; vol. AP-50; Issue 4; pp. 469-474; Apr. 2002.

Lewis, F. L.; Chapter 2: Wireless Sensor Networks; in Smart Environments: Technologies, Protocols, and Applications (eds Cook and Das); John Wiley & Sons, Inc.; Hoboken, NJ, USA; Sep. 2004 (pre-publication copy, 18 pgs.).

Liang et al.; Design and implementation of wireless smart-home sensor network based on ZigBee protocol; IEEE; International Conf. on Communications; Circuits and systems, ICCCAS 2008; May 25-27, 2008.

Liu et al.; Design of antenna radome composed of metamaterials for high gain; Antenna and Propogation Society Symposium; IEEE; pp. 19-22; Jul. 9-14, 2006.

Marcincak, Martin; AirGrid M5; 3 pgs.; Jan. 27, 2010; retrieved from the internet: http://www.youtube.com/watch?v=L4Z99Uzz-Bc (this web address was available to applicant(s) at least as of Jan. 27, 2010).

Nakajima et al.; A simple and efficient selective repeat scheme for high throughput WLAN; IEEE802.11n; IEEEVTS Vehicular Tech. Conf. Proc.; pp. 1302-1306; Apr. 22-25, 2007.

NETVOX; Intelligent home automation system (Product Catalog); 123 pgs.; retrieved from the internet on Jul. 8, 2014 (http://www.netvox.com.tw/download/Netvox%20Catalog(English%20Version)%2020131129.pdf).

Open Networking Foundation; OpenFlow management and configuration protocol (OF-Config 1.1); retrieved from the internet: (www.opennetworking.org/images/stories/downloads/sdn-resources/onf-specifications/openflow-config/of-config-1.1pdf); 117 pgs.; Jun. 25, 2012.

Rosenberg et al.; Session Traversal Utilities for NAT (STUN); 52 pgs.; Oct. 2008; retrieved from the internet on Mar. 6, 2014 from http://tools.ietf.org/search/rfc5389.

Russell et al.; The Bayeux Specification; 25 pgs.; 2007; retrieved from the internet on Mar. 6, 2014 from http://svn.cometd.org/trunk/bayeux/bayeux.html.

Streakwave Wireless; Ubiquiti Nanobridge m Series Product Overview; 2 pgs.; Jan. 12, 2012; retrieved from the internet: http//www.youtube.com/watch?v=DF__hx6iDIAM (this web address was available to applicant(s) at least as of Jan. 12, 2012).

Ubiquiti Networks; AirGrid M Datasheet; © 2011-2013; pp. 1-10; Jun. 21, 2013; retrieved from the internet (http://dl.ubnt.com/datasheets/airgridm/agmhp__datasheet_web.pdf).

Ubiquiti Networks; Nanobridge M Quick Start Guide; 20 pgs.; Mar. 27, 2012; retrieved from the internet (http://dl.ubnt.com/guides/nanobridge/nanobridge__M__QSG.pdf).

Zhang et al.; Prediction-based link-layer dynamic fragmentation and aggregation for wireless mesh networks; 2008 ISECS int. Colloquium on Computing, Communication, Control, and Management; vol. 2; pp. 582-586; Aug. 3-4, 2008.

\* cited by examiner

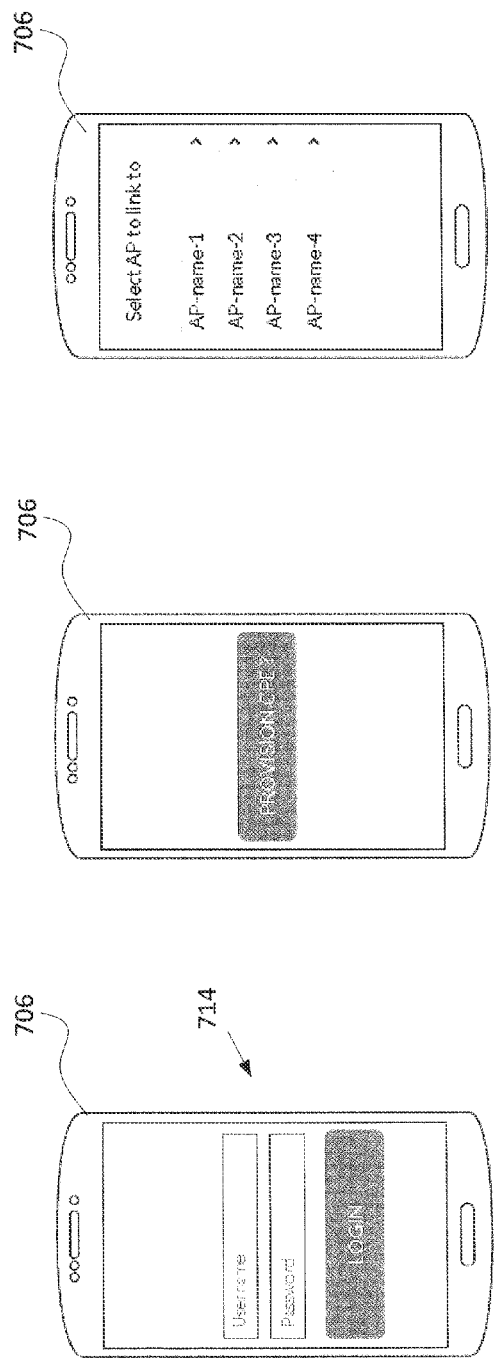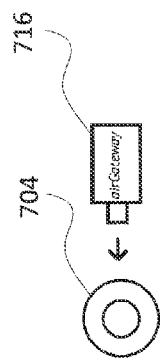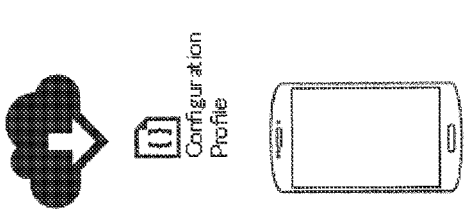
FIG. 7A  FIG. 7B  FIG. 7C  FIG. 7D  FIG. 7E

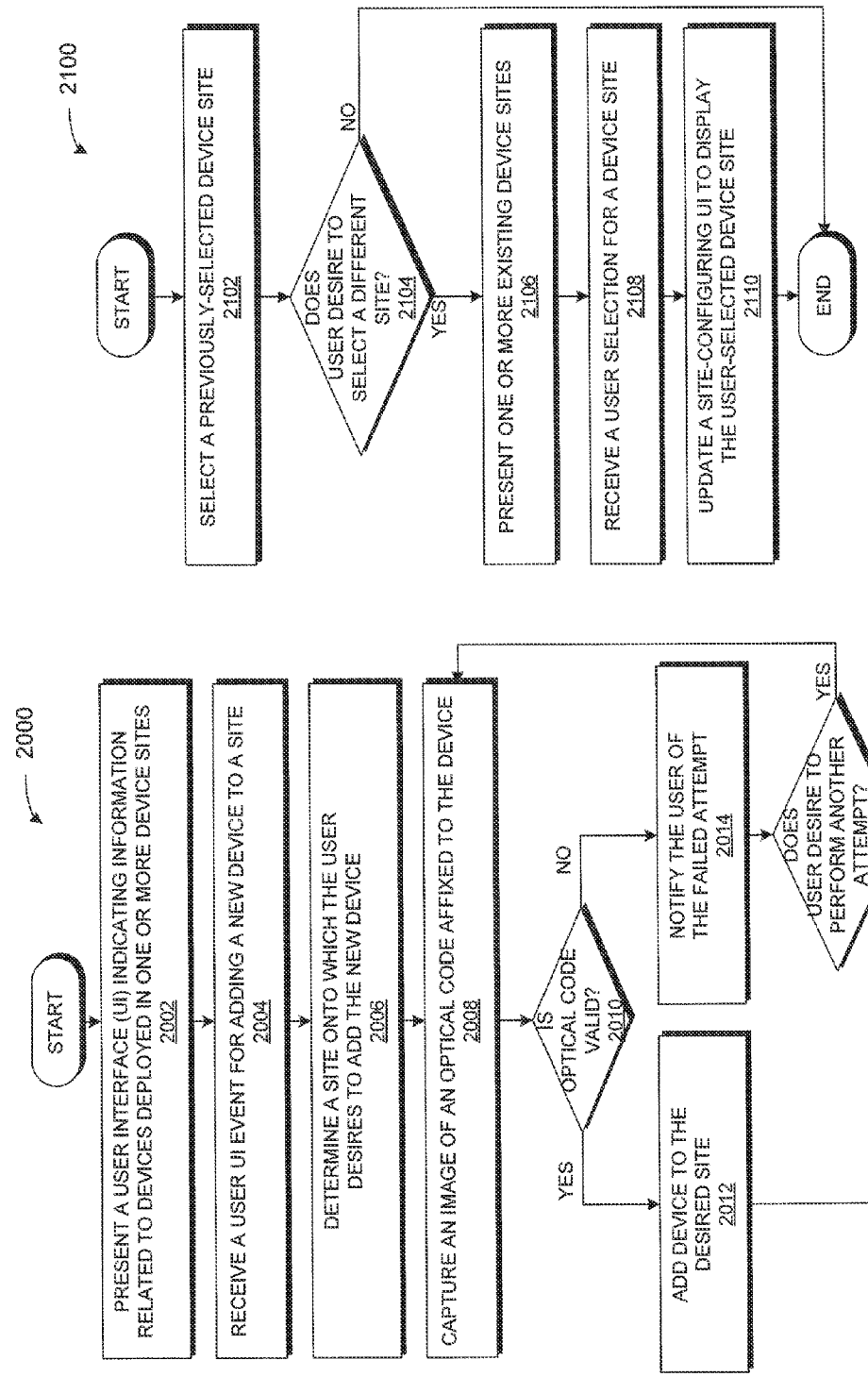

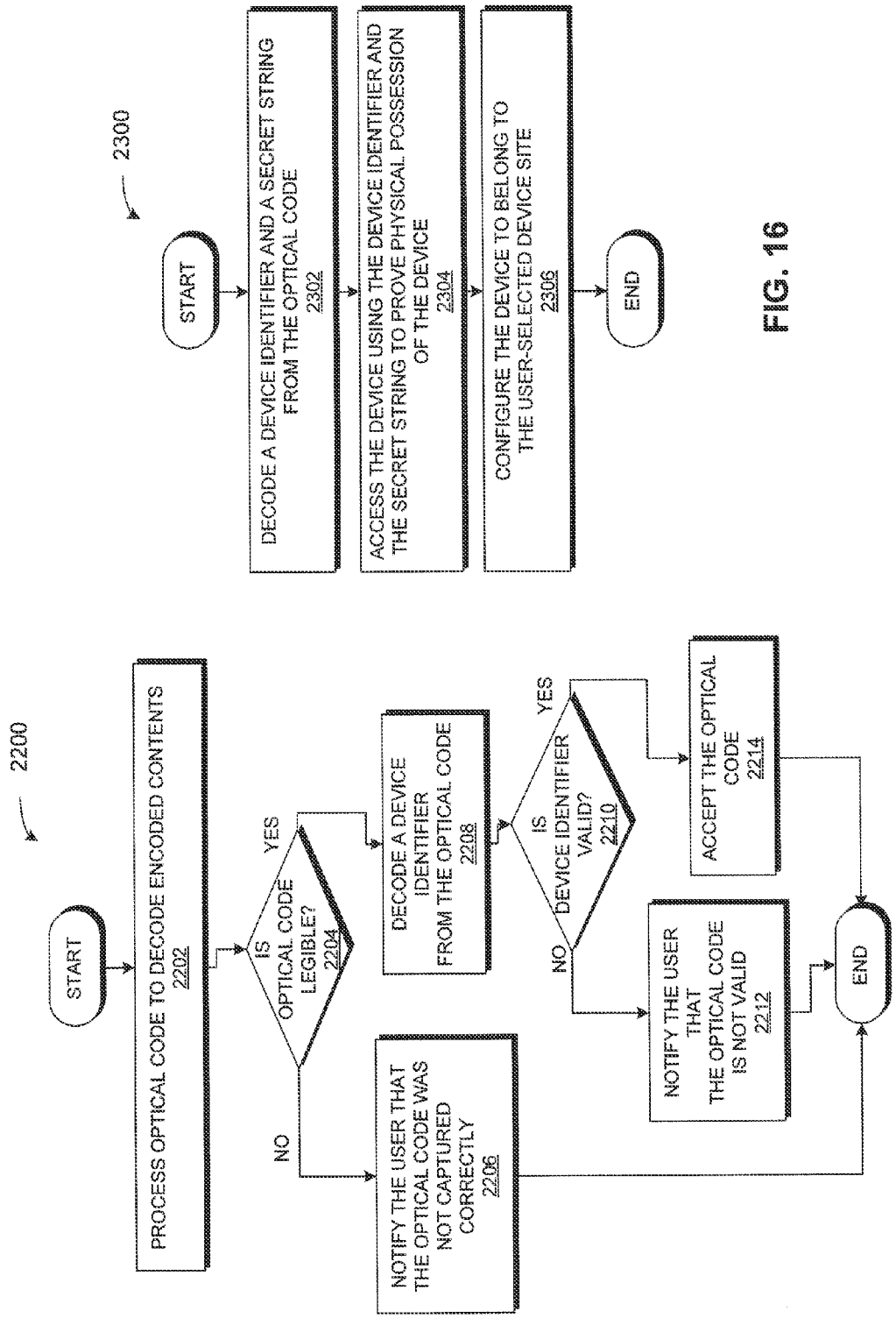

CLOUD DEVICE IDENTIFICATION AND AUTHENTICATION

CROSS REFERENCE TO RELATED APPLICATIONS

This patent application claims priority to U.S. Provisional Patent Application No. 61/970,763, filed Mar. 26, 2014, and titled "CLOUD DEVICE IDENTIFICATION AND AUTHENTICATION." This patent application also claims priority to U.S. Provisional Patent Application No. 61/949,918, filed Mar. 7, 2014, and titled "DIGITAL THERMOSTAT, POWER OUTLET, AND LIGHT DIMMER." Each of these patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure is related generally to identification and authentication of network devices. More specifically, this disclosure relates to identification and authentication of internet accessible devices through a cloud computing environment.

BACKGROUND

Many computing devices are equipped for communication over one or more types of computer networks, including wireless networks. Before a computing device is able to connect to a particular wireless computer network, the device typically may undergo some form of device provisioning. In this context, provisioning a device for wireless network connectivity may refer to any processes related to configuring the device for connectivity with one or more particular wireless device networks. For example, a customer-provided equipment (CPE) device (e.g., laptop, desktop, mobile device, etc.) may be provisioned with certain network settings that enable the device to connect and communicate with a particular wireless (or wired) network. In addition, network components (including access points, wireless routers, etc.) may be added to existing networks or may establish their own network, and may also need to be provisioned. In other examples, networks or devices, including sensors and home monitoring, security, and/or entertainment devices, may be provisioned with network settings that enable the devices (e.g., wireless sensors, cameras, etc.) to connect and communicate with other wireless sensors and with each other. With the Bluetooth protocol, some aspects of provisioning may be performed automatically using a wireless messaging dialog known as pairing. With Wi-Fi, provisioning may involve identifying an access point by name and providing security credentials.

As described herein, there may be particular difficulties, and benefits to connecting one or more wireless networks (and some or all of the devices connected to each "local" network) to a remote, e.g., cloud, server ("the cloud"). In particular, although the additional layer of the cloud server may make provisioning easier, in some variations, the potential for security risks is greater, in particular risk due to remote disruption (e.g., "spoofing"), which is even more serious when attacks may allow the tremendous amount of control over the network and individual devices via provisioning.

For some device use cases, appropriate network settings may be unknown to a manufacturer or service provider associated with a wireless device and provisioning the wireless device before it is provided to an end user may not be feasible for those uses. Further, provisional may also include specifying which network, and which geographic location, the device will be placed. For example, a particular wireless device may be intended for connectivity with a user's personal wireless network at the user's home, where the home network is connected to particular access point and gateway, and the network is connected to a cloud server.

In general, provisioning may refer to the process of preparing and equipping a device or network to allow it to provide new services to its users, and includes altering the state of an existing priority service or capability. For example, device provisioning may refer to authenticating a network device, such as an access point, to verify that a user can connect and operate through the device. In some variations, a device may be provisioned in order that it may communicate and/or be controlled and/or monitored by a cloud server (or software/hardware/firmware operating on a remote, e.g., cloud, server).

Provisioning may configure a system/network to provide a verified user with access to data and technology resources. For example, provisioning may give a user's access based on a unique user identity, and appropriate resources for the user. The provisioning process may monitor access rights and privileges to ensure the security of a resource and user privacy, and may also ensure compliance and minimize the vulnerability of systems to penetration and abuse. Provisioning may also reduce the amount of custom configuration.

Provisioning of "new" devices (e.g., factory-new) device may be relatively straightforward, as the first installer/user of the device is likely to be legitimately adding it to a network (and/or cloud layer). However, provisioning of existing device (e.g., devices that have been previously operated, e.g., as part of an existing network either in communication with a cloud computing environment or as part of an existing network that was not yet in communication with the cloud computing environment. Such existing device may pose an enhanced risk because potential security attacks (e.g., spoofing) may resemble legitimate new provisioning of the devices (e.g., when they change networks, locations or users).

Current techniques for authenticating a network device, including CPEs and access points, may not address the problems identified above. For example, current authentication typically relies on digital tokens (e.g., exchanged between a device and a remote server), or require a user to provide only the address (e.g., MAC address) and/or a passcode to authenticate the network device and may be vulnerable to fraud. The apparatuses (including system and/or devices) and method described herein may address these problems.

SUMMARY OF THE DISCLOSURE

Described herein are methods and apparatuses for authentication and/or provisioning of wireless network devices, and in particular, methods and apparatuses for authentication and/or provisioning of wireless network devices that are communicating and may be monitored and/or controlled by a remote (e.g., cloud) server.

In general, the authentication methods described herein may include the independent exchange of one or more "keys" (secret messages) between each of three (or more) components, including the cloud server (which may be referred to herein as a cloud computing environment or a remote computing environment, or a remote server, or device-provisioning server, or simply as the "cloud"), a network device installed or to be installed and provisioned in the network including the cloud server, and a computing device (which may be referred to as a provisioning device, a local user device, a user device, a user computing device, a mobile device, or the like). The network device is typically a device that is intended to be included into the network and/or networked with the cloud. The network device may be referred to as a local device, a networkable device, a wireless and/or wired access device, and may be any appropriate CPE and/or AP and/or gateway, or may communicate with one or more of these.

For example, a method of authenticating (which may be referred to as a method of authenticating, a method of trusting, a method of proving the identify of) all of some of the network device, cloud, and computing device may generally compare a key that is separately and independently sent to the cloud by each of the network device (s) and the computing device, where the key was generated by either the network device or the computing device and separately and independently exchanged between the network device and the computing device before they separately and independently send the key to the cloud.

In principle, any of these methods could alternatively or additionally include comparing a separate key received by the user in the computing device (from both the cloud and the networking device, where each copy of the key was independently sent and transferred between the network device and cloud, and generated by either the network device or cloud) and/or a separate key received by the network device (from both the cloud and the computing device, where the copies of the key were independently sent to the network device after being independently transferred between the cloud and the computing device and generated by either the cloud or the computing device). Thus each hub (network device(s), computing device and cloud) may be separately or jointly validated using the general methods described herein.

Once one or more of the hub members (and typically the cloud) verifies that the independent keys match, provisioning may be allowed to occur. In some variations, provisioning (at least the initial steps) may be combined with the authentication methods and apparatuses described herein.

In general, any of the apparatuses described herein may be configured to perform any (some or all) of the methods described herein. For example, any of the apparatuses (systems and methods) described herein may be configured so that the apparatus includes software, hardware (e.g., circuitry) and/or firmware (including a circuitry component), to perform the methods described herein.

In some variations, the methods of authenticating described herein (e.g., authenticating one or more network device(s), a user/installer operated computing device such as a smartphone, and/or a cloud server) may include an independent initial exchange of information between two of the hubs (e.g., the network device(s) and the computing device) using an information transmission pathway that is local (e.g., so that the two hubs may be in proximity, including in immediate proximity), and wired or wireless. In particular, the transmission pathway may be optical (e.g., reading a code from the network device(s) and/or the computing device by the other node). In addition, this transmission pathway is typically independent from the separate transmission pathways between the two hubs (e.g., network device and computing device) to the cloud, which may also be wired or wireless.

After the separate exchange of the code(s) between the two hubs, the code may be sent to the third hub (e.g., cloud), which may then either respond a secret key that is separately transmitted to either (or both) the first and second hubs, so that it can be independently read by either the first and/or second hub using a separate transmission path that is local (e.g., optical, sonic, tactile, etc.). To verify the physical proximity between the hubs (e.g., computing device and network device), the key may then be transmitted back to the third hub (e.g., cloud) using a different transmission pathway.

For example, in some variations, a system, apparatus and/or method for authenticating a network device through a cloud computing environment may be configured to include: connecting a network device to the cloud computing environment; obtaining a unique identifier from the network device; sending the unique identifier to the cloud computing environment from a computing device; sending an authentication key from the cloud computing environment to the network device to be presented by the network device; obtaining the authentication key from the network device; and sending the authentication key from the computing device to the cloud computing environment to authenticate the network device.

For example, connecting a network device to a cloud computing environment may include directly (wired or wirelessly) communicating the two device. In many of the examples described herein, the authentication is part of a provisioning method and/or system in which the networking device must be provisioned before it can completely communicate with the cloud environment. Thus, connecting the network device and the cloud may be an optional step and/or may include partial (provisional) connection, in which only some (e.g., minimal) connectivity is achieved. Thus, in some variations the cloud environment may be configured to provisionally communicate with unprovisioned device(s). A simple character exchange may therefore be possible. Any method of connection, but in particular wireless connections may be used, for example, from the network device(s) to the cloud via an internet connection.

In general, the step of obtaining a unique identifier from the network device typically includes obtaining the unique identifier from a path that is both local and independent (independent of any connection between the network device and the cloud and/or the computing device and the cloud). A local path may refer to a path that is optimal and/or requires a near proximity to communicate information from the network and/or computing device. For example, the step of obtaining may include obtaining optically (by taking an image of a code, such as a QR code, bar code, alphanumeric code, etc.) on one of the network device and/or computing device. In some variations the code may be transmitted using a local electromagnetic network (e.g., RFID), or other wireless (e.g. sonic, including ultrasonic) communication.

The step of sending the unique identifier to the cloud computing environment from the computing device may include transmitting the unique identifier (e.g., read from the network device(s) by the computing device, such as a handheld or desktop computer/smartphone) via a wireless network including a telecommunications network (e.g., using a 4G/3G/GSM/EVDO network). In general, this network may preferably be a connection between the node (e.g., the computing device) and the cloud that is separate and independent of the connection between the other node (the network device (s)) and the cloud.

The cloud may then send an authentication key ('secret code') which it may generate uniquely for this transaction or may otherwise generate, from the cloud computing environment to the network device, so that the network device can present it for local detection by the computing device. For example, once received by the network device (or in an alternative variation by the computing device), the network device may display or otherwise locally project it so that it can be read by the computing device. For example, the code may be displayed on a screen (or LEDs) for reading by the computing device. In some variations the code is an alphanumeric, or series of alphanumeric (e.g., sequence of images, flashes, tones, etc.).

Once the other node (e.g., the computing device) has obtained the authentication code (secret code), it may then send it back to the cloud computing environment to authenticate the network device. Thereafter the network device and the computing device may be trusted by the cloud, and provisioning may proceed (or continue). For example, additional software and/or firmware may be downloaded into the one or more network devices, setting of the network device(s) may be changed, and the network device may be controlled (e.g., restarted). Ultimately, the network device(s) may communicate directly with the cloud without the computing device. This is illustrated in more detail herein.

For example, described herein are methods for authenticating a network device through a cloud computing environment, comprising: obtaining a unique identifier of the network device using a computing device to read the unique identifier from an outer surface of the network device; sending the unique identifier from the computing device to the cloud computing environment; transmitting an authentication key from the cloud computing environment to the network device, wherein the network device presents the authentication key for detection by the computing device; obtaining the authentication key with the computing device from the network device when the computing device is in the presence of the network device; sending the authentication key from the computing device to the cloud computing environment; and confirming the authentication key from the computing device to authenticate the network device.

As mentioned, any appropriate unique identifier may be used, including (but not limited to) a bar code, a QR code, or an alphanumeric code, which may be on the network device. The network device may be an access point, CPE, gateway, etc. including sensors forming part of a sensing/monitoring network. In general, the computing device may be a handheld computing device, such as a smartphone, pad, or the like. In some variations, the computing device is a personal computer Also described herein are method and apparatuses for provisioning one or more network devices. Any of these provisioning methods and apparatuses may also include validation, e.g., including validation that a computing device ordering the provisioning is legitimately allowed to provision the network device(s). In particular, any of these apparatuses may allow provisioning of a network device to communicate (e.g., directly) with a cloud server.

For example, described herein are computer-implemented methods, comprising: capturing an image of an optical code affixed to a network device, wherein the optical code encodes a unique identifier for the device; obtaining a user-specified selection of a device site within which the device is to operate; determine whether the unique identifier corresponds to a known device; and responsive to the optical code's unique identifier corresponding to a known device, provisioning the device to operate in the user-specified device site.

The unique identifier may include the device's media access control (MAC) address. The optical code may encode the device's MAC address in encrypted form. The optical code may encode a secret string. The secret string may be encoded in encrypted form.

Any of these methods may also include: responsive to the optical code's unique identifier corresponding to a known device, communicating the secret string to the device to prove physical possession of the device.

For example, any of these methods may include determining whether the optical code's unique identifier corresponds to a known device involves: decoding the unique identifier from the optical code; and determining whether the unique identifier is a known identifier.

The device may include a wireless access point for configuring the device. Provisioning the device may involve: decoding a secret string from the optical code; and sending the secret string to the device as an authentication password for accessing the device's access point. Provisioning the device may involve: decoding a secret string from the optical code; and after accessing the wireless access point, sending the secret string to the device to establish a trusted session with the device.

The wireless access point may be configured to have a default service set identifier (SSID) that corresponds to an unprovisioned device.

Any of these methods may also include: searching for unprovisioned devices by accessing the default SSID.

For example, a non-transitory computer-readable storage medium storing instructions that when executed by a computer may cause the computer to perform a method including: capturing an image of an optical code affixed to a device, wherein the optical code encodes a unique identifier for the device; obtaining a user-specified selection of a device site within which the device is to operate; determine whether the unique identifier corresponds to a known device; and responsive to the optical code's unique identifier corresponding to a known device, provisioning the device to operate in the user-specified device site.

As mentioned, the unique identifier may include the device's media access control (MAC) address. The optical code may encode the device's MAC address in encrypted form. The optical code may encode a secret string. The secret string may be encoded in encrypted form.

In some variations, the storage medium is configured to: responsive to the optical code's unique identifier corresponding to a known device, communicating the secret string to the device to prove physical possession of the device. Determining whether the optical code's unique identifier corresponds to a known device may involve: decoding the unique identifier from the optical code; and determining whether the unique identifier is a known identifier. The device may include a wireless access point for configuring the device. Provisioning the device may involve: decoding a secret string from the optical code; and sending the secret string to the device as an authentication password for accessing the device's access point. Provisioning the device may involve: decoding a secret string from the optical code; and after accessing the wireless access point, sending the secret string to the device to establish a trusted session with the device.

The wireless access point may be configured to have a default service set identifier (SSID) that corresponds to an unprovisioned device. The storage medium may be further configured for: searching for unprovisioned devices by accessing the default SSID.

Also described herein are apparatus, comprising: an image-capturing module to capture an image of an optical code affixed to a network device, wherein the optical code encodes a unique identifier for the network device; a user-input module to obtain a user-specified selection of a device site within which the network device is to operate; an analysis module to determine whether the unique identifier corresponds to a known device; and a provisioning module to provision the network device to operate in the user-specified device site, responsive to the optical code's unique identifier corresponding to a known device.

The unique identifier may include the device's media access control (MAC) address. The optical code may encode the device's MAC address in encrypted form. The optical code may encode a secret string. The secret string may be encoded in encrypted form. The apparatus may be further configured to include a communication module to communicate the secret string to the device to prove physical possession of the device, responsive to the optical code's unique identifier corresponding to a known device. Any of the modules described herein may also be referred to as circuits and may include software, hardware and/or firmware configured to perform the recited function. For example, a communication module may include wireless circuitry and/or control logic for controlling wireless circuitry (e.g., wifi, Bluetooth, one or more RF radios, etc.). Determining whether the optical code's unique identifier corresponds to a known device may include an analysis module further configured to: decode the unique identifier from the optical code; and determine whether the unique identifier is a known identifier. The analysis module may include circuitry and/or firmware and/or software, including one or more comparators adapted/configured to determine whether the unique identifier is a known identifier.

The device may be or may include a wireless access point for configuring the device. Provisioning the device may involve a provisioning module that is further configured to: decode a secret string from the optical code; and send the secret string to the device as an authentication password for accessing the device's access point. As mentioned, the provisioning module may include software, hardware and/or firmware adapted to decode a secret string from the optical code; and send the secret string to the device as an authentication password for accessing the device's access point. Thus, the provisioning module may include circuitry configured to operate as a provisioning module, and may include one or more registers configured to hold all or part of the authentication password as described.

Provisioning the device may include any of the provisioning modules described. For example, a provisioning module may be configured to: decode a secret string from the optical code; and send the secret string to the device to establish a trusted session with the device, after accessing the wireless access point. For example, the provisioning module may include circuitry and/or firmware and/or software adapted to decode a secret string from the optical code; and send the secret string to the device to establish a trusted session with the device, after accessing the wireless access point. For example, the provisioning module may include circuitry having one or more comparators (including registers (e.g., memory) and amplifiers, e.g. op amps, and/or other circuitry) controlled (e.g., guided by software and/or firmware) to operate as the provisioning module.

The wireless access point may be configured to have a default service set identifier (SSID) that corresponds to an unprovisioned device. In some variations, the provisioning module may be further configured to search for unprovisioned devices by accessing the default SSID.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 7A-7I illustrates another method for authenticating a network device.

FIG. 13 presents a flow chart illustrating a method for provisioning a device in accordance with an embodiment.

FIG. 14 presents a flow chart illustrating a method for selecting a device site for provisioning a network device in accordance with an embodiment.

FIG. 15 presents a flow chart illustrating a method for processing an optical code in accordance with an embodiment.

FIG. 16 presents a flow chart illustrating a method for configuring a device to a device site, based on information decoded from an optical code in accordance with an embodiment.

DETAILED DESCRIPTION

Apparatuses (systems and devices) and methods are described herein for authentication and/or provisioning of device, particularly methods and apparatuses for authentication and/or provisioning of systems and apparatuses that form part of a wireless network that is in communication and at may be partially controlled by a remote (e.g., cloud) server.

For example, described herein are provisioning of wireless network devices/apparatuses that includes authentication and identification of the network devices and the user (e.g. operating a second computing device and particularly a mobile telecommunications device configured as the second computing device) by the remote (cloud) server. The authentication may also verify the remote cloud server.

For example, any of the apparatuses and methods described herein may be configured to provision one or more network devices after and/or during authentication of the network apparatus, a user-controlled apparatus (e.g., computing device) overseeing the provisioning, and/or a cloud computing environment (e.g., cloud). Part I of the description herein includes authentication, which may be particularly useful in authentication one or more (e.g., all) nodes of a network (such as the cloud computing level of nodes, the network device(s) node, and a user/administrator computing device node, which may instigate or guide provisioning).

Part I: Authentication

The apparatuses and methods disclosed herein typically require more than one "secret" or code to authenticate and identify the network device. These apparatuses and methods may also require more than one independent pathway to verify/confirm authorization codes. These techniques can ensure that a user trusts that their devices are under their control, and that the network devices can trust that the users are who they claim to be. For security purposes, authentication may be a prerequisite to completing provisioning. Although any of the components of the provisioning may be verified (e.g., the cloud, the network device, a user/network administrator computing device) it may be particularly important to verify that the user/administrator triggering the provisioning is legitimate and/or that the network device(s) being provisioned are appropriately being modified, particularly if they were already part of an existing network, or the same network, and that changes or modifications are being made.

Figure 1:
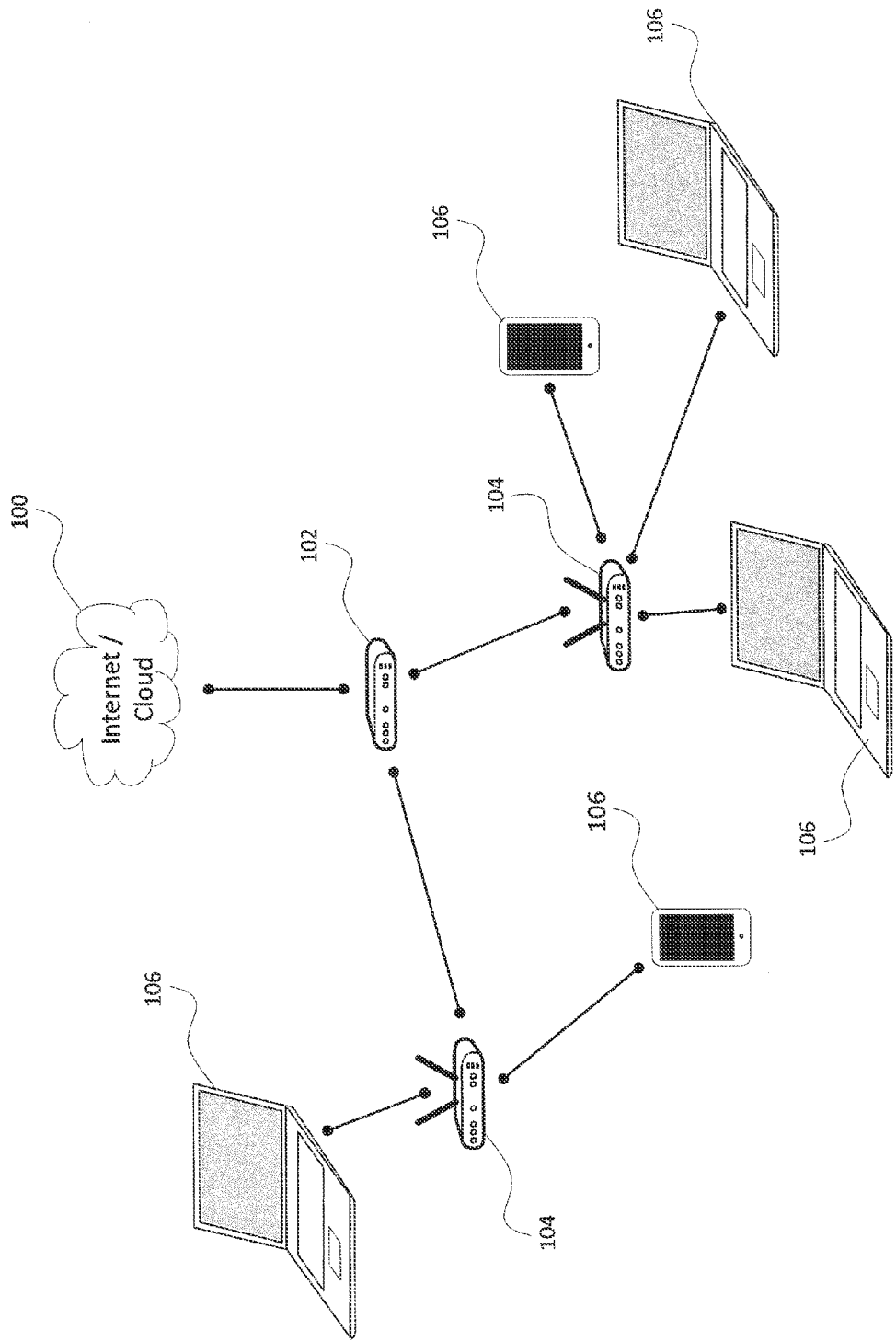
FIG. 1 shows a functional diagram of a network that connects to a remote server (e.g., cloud).

FIG. 1 shows a functional diagram of a network that connects to the internet or cloud 100. The network can include both fixed and mobile stations (network devices). A broadband modem 102 can receive and communicate information from the cloud 100 (e.g., via an internet service provider). The broadband modem can communicate with one or more network devices 104, such as access points, via wireless or wired connections to provide internet access to computing devices 106 in the network. Users of the network can then access the internet or cloud with the computing devices. A cloud based management system for the management and control of the network devices 104 can reside on the cloud 100.

Also described and shown are computing devices 106 that can comprise, for example, personal computers, notebook computers, tablets, mobile phones, or any other wireless or wired devices that require an internet connection to communicate with the cloud. These computing devices may also be considered network devices, and may be connected to the network devices according to the protocol inherent in the design of the device, for example Wi-Fi, Bluetooth, or others. The protocols may have different speeds or data rates for transmitting and receiving data between the computing device(s) 106 and the network devices 104. During wireless operation the data rate may change to reduce the impact of any interference or to account for other conditions. In some variations, a computing device may be used to guide and/or trigger provisioning of one or more network device. For example a smartphone may be used to guide provisioning of one or more CPE (e.g., computer, etc.) 106 so that it may communicate with the cloud, allowing the cloud to monitor and/or control, and/or regulate the operation of the network and/or individual devices 104,106. Provisioning may be necessary for the devices to operate as part of this cloud-including network.

In operation, each computing device 106 may connect to the network device 104 through its own protocol establishing the communication rate for the wireless network. The network devices 104 can be processing devices having a memory which may use both wireless communications or hard wired communications as an input-output means. Once the communication rate is established, data from the cloud 100 can be coupled to the computing devices 106 through the network and the access points 104 allowing communications to occur.

Network devices, access points (AP's), and the like generally refer to devices capable of wireless communication with wireless devices and capable of either wired or wireless communication with other devices. In some embodiments, network devices communicate with external devices using a local network. However, there is no particular requirement that network devices have an actual wired communication link. In some embodiments, network devices might communicate entirely wirelessly.

Computing devices, wireless devices, wireless stations, mobile stations, and the like, may generally refer to devices capable of wireless and/or wired communication with network devices. In some embodiments, computing devices implement a wireless communication standard such as IEEE 802.11a, 11b, 11g, or 11n. However, in the context of this disclosure, there is no requirement that this particular communication standard is used, e.g., the wireless communication might be conducted according to a standard other than 802.11, or even according to a an IEEE standard entirely, or that all computing devices each use the same standard or even use inter-compatible communication standards.

In some embodiments, the network devices or AP's can include a cloud based management system that allows a user to remotely control and change the operation of the network devices. This disclosure provides authentication and identification protocols that can be put in place to prevent unauthorized use of the cloud based management of access points. In some embodiments, this device authentication can include the requirement of a hardware identifier and a block of identifying device data which may be cryptographically signed by the cloud server. Furthermore, this disclosure provides methods and protocols for implementing device authentication in access points that have changed ownership.

As described above, a typical network can include three parties that must be validated: The cloud 100, network devices 104, and users (via computing devices 106). For the system described above to work properly, users need to trust that all network devices 104 are under their control, and are not in the possession of another party. The network devices need to trust that the users are who they claim to be (i.e., that the user asserting control over the device is the owner), and the cloud needs to know who the users are and what devices they control.

Figure 2A:
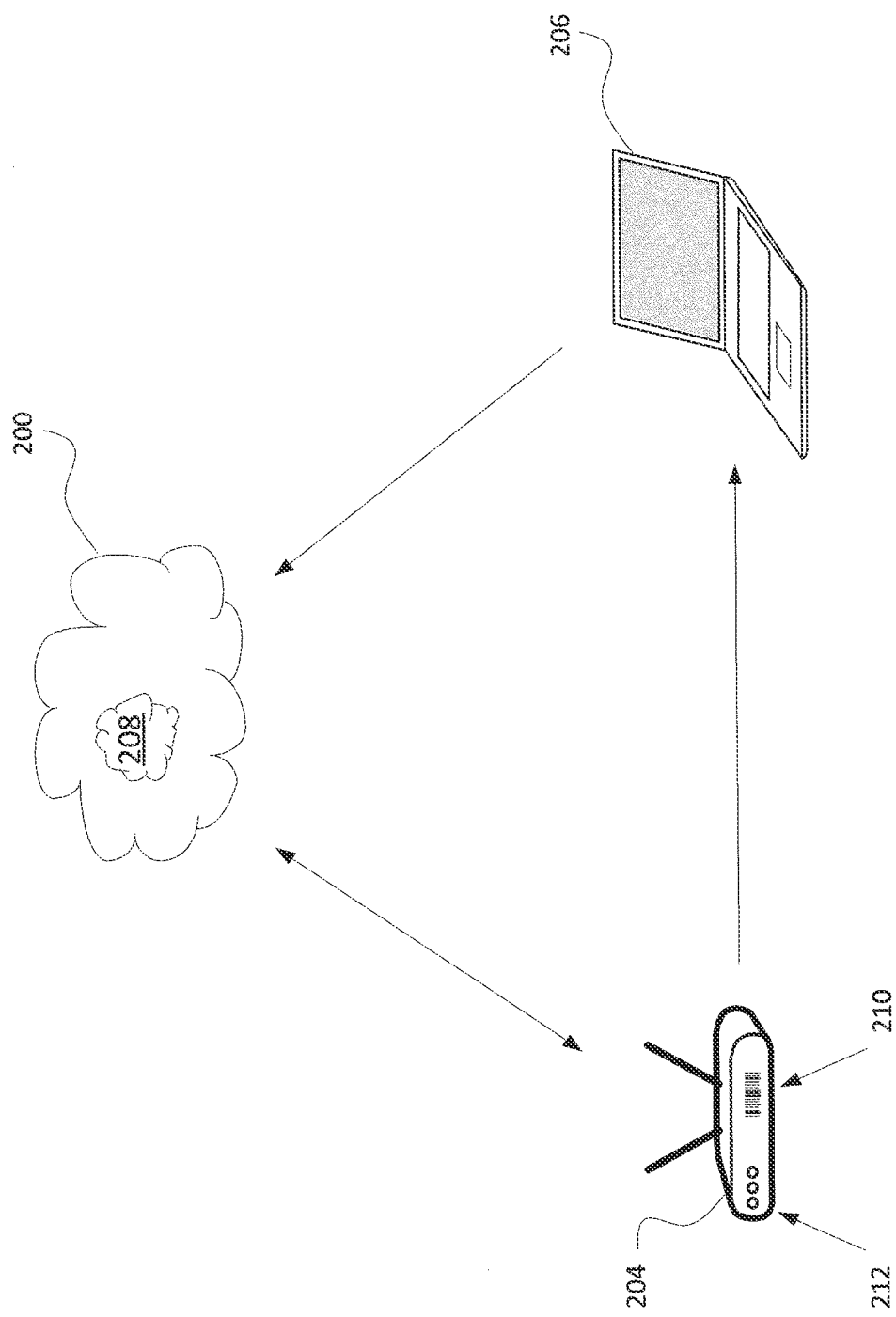
FIG. 2A is a schematic diagram showing one embodiment for authenticating and identifying a network device.

As described in the summary above, one solution for authenticating and identifying a network device in a network, e.g., when and/or before provisioning or in other contexts, may include a unique identifier or password in or on the device, and utilizing a three-way handoff as shown in FIG. 2A. In FIG. 2A, a network device 204, such as an access point or CPE, can be entered into a network so as to communicate with the cloud 200. The network device 204 can be configured to automatically communicate with the cloud to uniquely identify itself to the cloud based management system 208. This communication can open up two-way communication between the cloud based management system 208 and the network device 204. However, before this communication can be established, it may be desirable to confirm that the request (e.g., coming from a third computing device), the network device, and the cloud are all legitimate.

Figure 3:
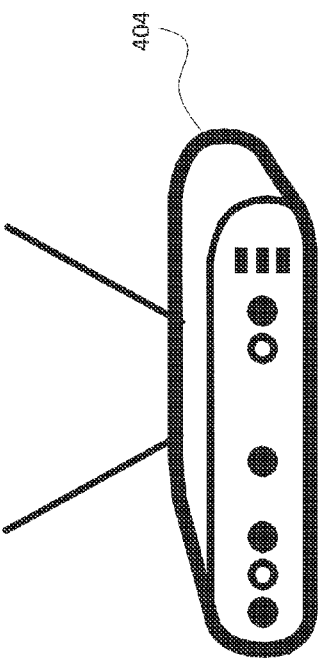
FIG. 3 shows one embodiment of a unique identifier for authentication and identification of a network device.

For example, a user or system administrator can obtain a unique identifier 210 from the network device 204. The unique identifier may be a code physically on the device itself, such as a bar code, a quick response (QR) code, a numeric code, written letters, or an alphanumeric code, for example. FIG. 3 shows an example of a network device 304 having a unique identifier 310 comprising a bar code.

Referring back to FIG. 2A, the user can send the unique identifier 210 to the cloud based management system 208 to indicate to the cloud that the user is in the physical presence of the network device 204. The user can send the unique identifier to the cloud based management system with a computing device 206, such as a PC, mobile phone, or tablet with internet access. If the unique identifier is a bar code or a QR code, the code can be scanned by the user with a mobile phone, tablet, or scan reader to send the code to the cloud based management system.

Figure 4:
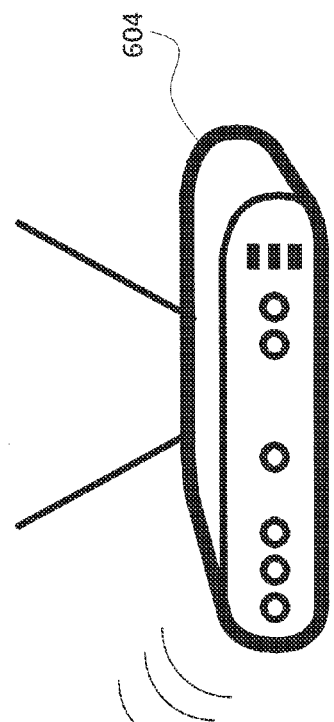
FIG. 4 shows an embodiment of an authentication key presented by a series of lights or indicators for authentication and identification of a network device.
Figure 5:
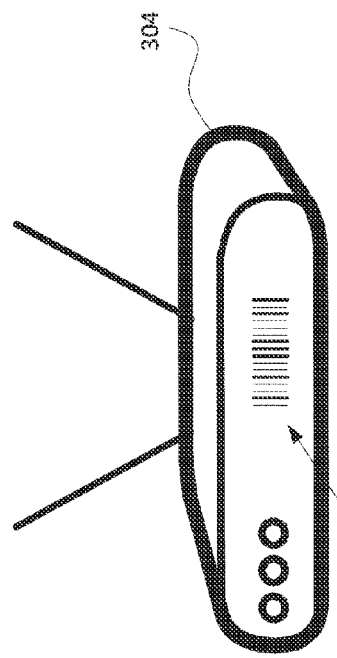
FIG. 5 shows another embodiment of an authentication key comprising a code presented on a display for authentication and identification of a network device.
Figure 6:
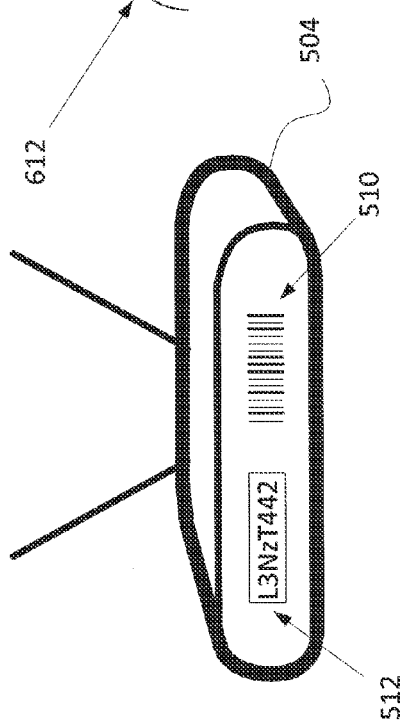
FIG. 6 is another embodiment of an authentication key comprising an audible sound for authentication and identification of a network device.

Upon receiving the unique identifier from the user, the cloud based management system 208 can send the network device 204 an authentication key that can be presented to the user. In FIG. 2A, the network device includes indicators or display 212. However, the authentication key may be broadcast to the user via a display on the device, a series of blinking lights or indicators, or an audible signal, for example. FIG. 4 shows an embodiment of a network device 404 where the authentication key of a network device 404 is presented to the user in a series of blinking lights or indicators 412. FIG. 5 shows an embodiment where the unique identifier 510 comprises a bar code and the authentication key 512 is presented to the user as an alphanumeric code on a display screen. FIG. 6 illustrates another embodiment in which the authentication key 612 of a network device 604 comprises an audible signal, such as a spoken word or password or a series of beeps or noises.

Referring again to FIG. 2A, the user can complete the identification and authentication of the network device 204 by sending the authentication code from computing device 206 to the cloud based management system 208. The method presented above and in FIG. 2A ensures that the user is in the presence of the network device during authentication.

Figure 2C:
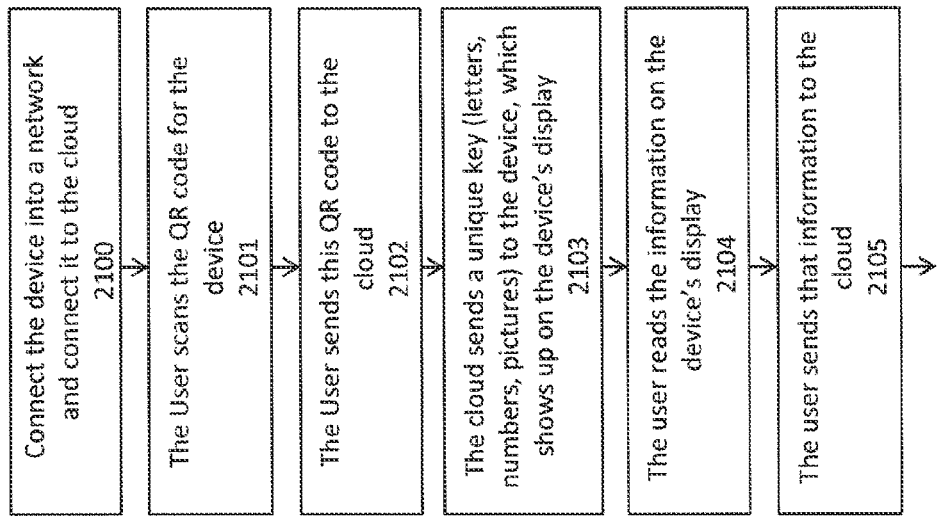
FIG. 2C is a flow diagram of FIG. 2B, describing the method of authenticating and identifying the device.
Figure 2B:
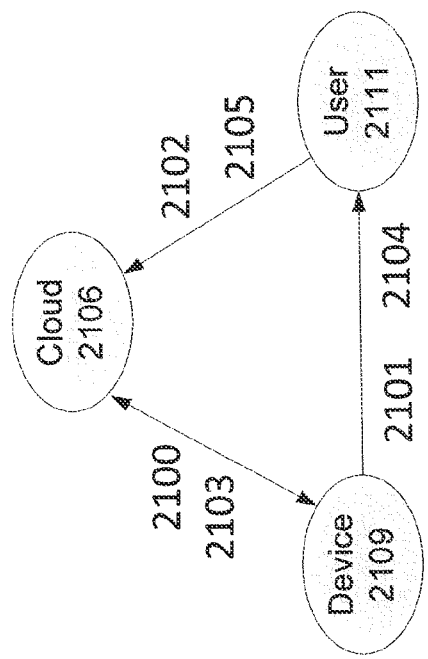
FIG. 2B is a schematic diagram of one method of authenticating and identifying a network device before or during provisioning.

FIGS. 2B-2C illustrate another example of an authentication apparatus and method of authentication. For example, in FIG. 2B, a network device 2109 may be part of an existing network (e.g., comprising or connected to an AP and/or internet gateway) that is going to be modified or updated to talk with a cloud server 2106, or it may be a new device to be installed (or an old/existing device installed at a new location, etc.), and a user computing device 2111 may be used (e.g., by a system administrator, installer, user, or the like) to add the device to the cloud-connected network.

In this example, the network device 2109 may be modified by the user device 2111 after verifying (authenticating). FIG. 2C is a process flow illustrating one method (including optional steps) for verifying, by the cloud, that the network device 2109 and user device 2111 are legitimate before modifying/adding the network device 2109 to communicate with the could 2106. As illustrated in FIG. 2C, the network device may be connected 2100 (or may be already connected) to the cloud 2106 computing environment. As mentioned, this connection may be provisional (meaning they may share some information, but it may not be complete, e.g., until provisioning is complete).

The computing device operated by a user 2111, may be, for example, a handheld (e.g., smartphone) device. It may then scan/probe the network device 2109 to receive a code associated (uniquely associated) with the device. This communication between the device 2109 and the user 2111 may be local, and may use a communication channel that is independent and distinct from the communication between the user and the cloud and/or the device 2109 and the cloud 2106. For example, the computing device may be configured so that the user scans a code 2101 (e.g., bar code, QR code, alphanumeric code, etc.) from the device 2109 when in proximity to the device.

Thereafter the user may send the received code (e.g., QR code) to the cloud 2102. This transmission by the user 2111 to the cloud 2106 may use a communication path that is also distinct and independent from the connection between the device 2109 and the cloud 2106. For example, the user may contact the cloud 2106 using a network that is different from an existing network to which the network device 2109 is or will be connected, e.g., a telephonic network such as 3G/4G/GSM/EVDO, etc.).

The cloud computing environment 2106 may then transmit a unique key 2103 (e.g., secret key, which may be referred to herein as an authentication key) to the network device 2109. The key may be alphanumeric, a pattern of tones and/or flashes, etc. The network device 2109 may then present (e.g., display, locally broadcast, etc.) the authentication key so that it can be read (e.g., locally accessed) by the user computing device 2111. For example, as illustrated above, the network device(s) may display the key on a screen, display a pattern of lights/images on the outer surface, a series of sonic (including ultrasonic) tones or signals, may transmit via local RFID signal, or the like for detection 2104 by the user device 2111 or a local proxy for the user device 2111 (e.g., camera imaging the device 2109 communicating with the user 2111, etc.). Thus, although the communication may be local (e.g., from the device 2109 to the user 2111), the connection may be remote and transmitted by proxy.

Thereafter, the user computing device 2111 may then transmit the authentication key back to the cloud 2105, completing the loop, e.g., using the independent channel, so that the cloud may verify that the identity of all of the nodes (device 2109 and user 2111).

Figure 2E:
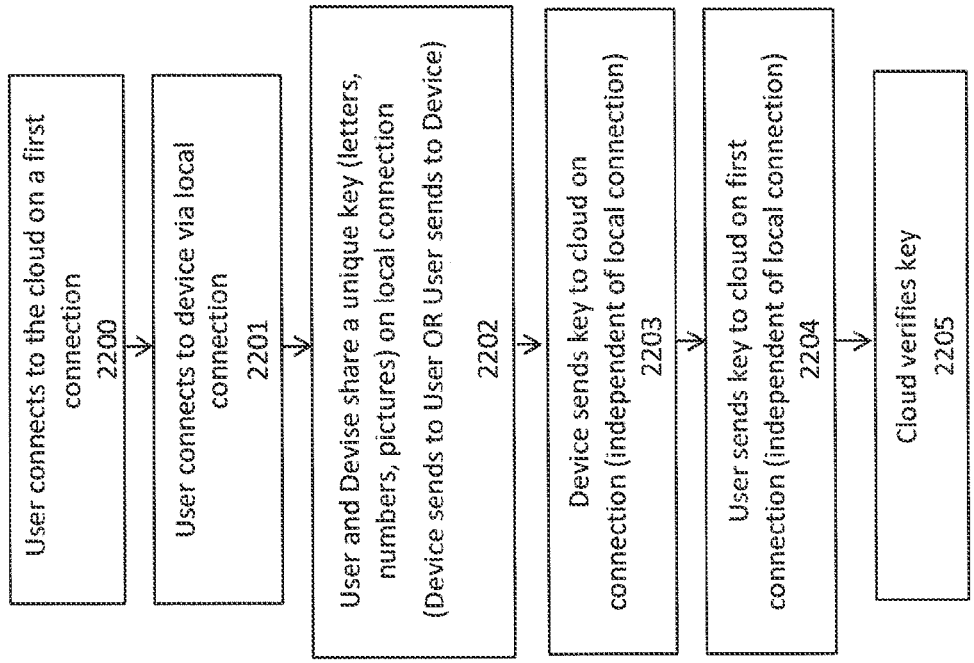
FIG. 2E is a flow diagram of FIG. 2D, describing the method of authenticating and identifying the device.
Figure 2D:
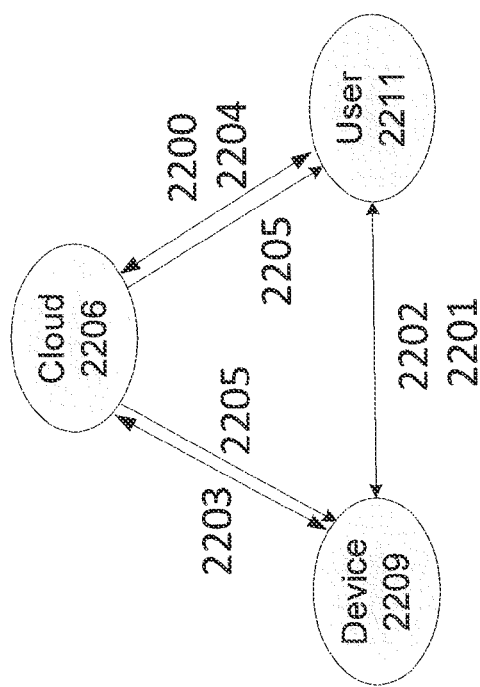
FIG. 2D is a schematic diagram of another method of authenticating and identifying a network device.

An alternative apparatus and method is illustrated in FIGS. 2D and 2E. In this example, the user (e.g., computing device) 2211 optionally and initially connects 2200 to the cloud 2206. The user then opens communication 2201 with the network device 2209 using a local channel/connection. The local channel may be a local network (e.g., RF network, including Bluetooth, sonic (including ultrasound), etc.). The user 2211 and the device 2209 may then share a unique key (e.g., the authentication key) 2202. For example, the device 2209 may generate an authentication key, or the user may provide the secure authentication key. Thereafter, the device may send 2203 this authentication key to the cloud 2206, using the connection (e.g., wireless internet connection) between the two. The user 2211 may also and independently transmit 2204 the key to the cloud 2206 using a channel that may be separate and independent of the connection between the device 2209 and the cloud 2206. In some variations, the cloud compares both keys to each other to confirm that they match and indicates a match to the user and network device 2205. In some variations, the cloud indicates a match to the network device, allowing it to continue with provisioning (or any other post-authentication procedure). Alternatively, in some variation the cloud may pass on the authentication key received from the user 2211 to the network device 2209 to allow the network device to itself confirm the authentication.

Part II: Provisioning

Also described herein a method and apparatuses for provisioning one or more devices (e.g., network devices) for operation with a cloud computing environment. As mentioned, above, any of these methods may include (but do not have to include) the authentication described above, or some other variation of authentication, as part of the provisioning.

Figure 7G:
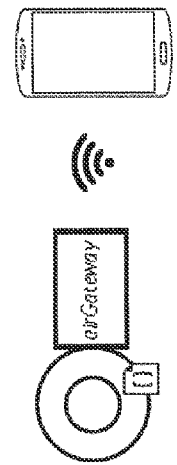

For example, FIGS. 7A-7G illustrate a method of provisioning a network device in a network. In this embodiment, a network device such as device 104 of FIG. 1 can be authenticated with a direct connection between the user and the device. Referring to FIG. 7A, a user can open an app or application 714 in a computing device 706 (e.g., a mobile phone, tablet, or PC) and request or initiate provisioning of a network device. For example, the computing device 706 may be configured to authenticate a network device in a network. In some embodiments, the computing device is configured by executing an application software, or otherwise including hardware and/or firmware (collectively referred to herein as "an app"). However, an application ("app") is not required and the user can instead log into a cloud app or website to authenticate the device directly.

In FIGS. 7A-7I, an authentication procedure may be embedded in the provisioning described.

In FIG. 7B, the user can select the option to authenticate or "provision" the network device (e.g., a nearby CPE). The nearby CPE may be detected (e.g., by a direct communication between the user computing device and the network device (e.g., CPE), including as described above, e.g., scanning an identifying code on the device, etc.). In some variation, the app detects the existing network and provides a user interface allowing selection of one or more network device(s). In FIG. 7C, the user can select the location (e.g., the access point) in a network to which the network device will be provisioned from a list of networks (shown in FIG. 7C as a list of APs). Alternatively or additionally a geographic map, showing the spatial relationship of the different networks and/or connections between different APs. Additional information (including signal strength, etc.) may be shown to assist the user in selecting the network location. Once the device and network is selected, the tool 714 can receive a configuration profile from the cloud for the chosen device, as shown in FIG. 7D. In another embodiment, the configuration profiles can be pre-loaded into the application software.

Note that in some variations, the identity of one or more of these nodes (the user/computing device, the network device (s) and the cloud) may be authenticated as described above, in the background or explicitly. For example, once the device is selected (e.g., which may include scanning a unique identifier) the steps of FIG. 2B-2C or 2D-2E may be performed to authenticate. If authentication does not "pass" the provisioning may be stopped. Alternatively or additionally, authentication may not be complete until further in the provisioning process described in this example, e.g., after a connection between the cloud and the network device (see, e.g., FIG. 7E) is confirmed, even in a pre-provisional status.

Figure 7I:
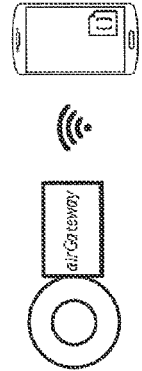
Figure 7F:
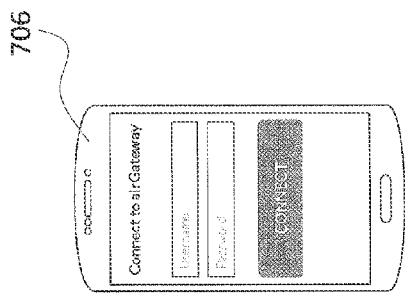

Referring to FIGS. 7E-7G, the user can connect the computing device 706 to the network device 704 to be authenticated. In some embodiments, the network device 704 may include its own Wi-Fi or wireless network which can be directly linked to the computing device 706. In other embodiments, it may be necessary to connect a wireless gateway 716 to the network device 704 to enable wireless connectivity, as shown in FIG. 7E. Alternatively, any other means of connection between the devices can be made, including Bluetooth, wired, or other wireless connection protocols. In FIG. 7F, the app 714 can detect the network device 704 when the wireless or wired connection is made, to make the connection as shown in FIG. 7G. In FIG. 7F, the connection between the network device and the computing device can be made automatically in the app 714. At FIG. 7G, the app can transfer the configuration profile to the network device (either directly from the user device or through the cloud connection, in this example facilitated by a connection using Ubiquiti Network, Inc.'s airGateway product).

Figure 7H:
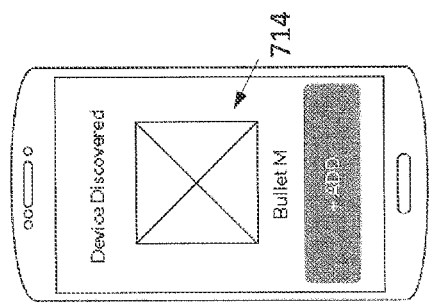

Once the configuration profile has been transferred to the network device, as shown in FIG. 7G, the device can connect to the cloud (i.e., the cloud based management system described above) to validate the configuration profile. The user can also automatically validate with the cloud using the app, as shown in FIG. 7H. This example of a validation method requires that the user be in a direct, trustworthy connection with the network device though the local network provided by the airGateway adapter (FIG. 7I).

For example, any of the method described herein may be considered methods of automatic and hands-free provisioning a network device to communicate with a network. For example a method of automatic and hands-free provisioning a network device to communicate with a network may include the steps of: attaching a bridging device to the network device; wirelessly transmitting information about the network device from the bridging device to the handheld computing device; transmitting an identifier of a selected second network and the information about the network device from the handheld computing device to a cloud computing environment; transmitting provisioning information from the handheld computing device to the network device; provisioning the network device with the provisioning information; and removing the bridging device from the network device, wherein the network device may communicate with the cloud computing environment through the selected second network directly.

In another example, a method of automatic and hands-free provisioning a network device to communicate with a network, the method comprising: attaching a bridging device to the network device, wherein the bridging device forms an ad hoc network wirelessly connecting the bridging device and a handheld computing device; wirelessly transmitting information about the network device to the handheld computing device; identifying a second network on the handheld computing device; transmitting an identifier of the second network and the information about the network device from the handheld computing device to the cloud computing environment; generating provisioning information for the network device so that the network device can connect to the second network; transmitting the provisioning information from the handheld computing device to the network device; provisioning the network device with the provisioning information; and removing the bridging device from the network device, wherein the network device may communicate with the cloud computing environment through the second network.

Any of these methods (or an apparatus configured to perform any of these methods) may include selecting the identified second network from a list of networks on the handheld computing device before transmitting the identifier of the selected second network. As discussed above, this list may be made up of networks that are present and accessible within the geographic location that the network device will be placed (e.g., statically placed). For example, the list may include a list of access points or network nodes that the network device can communicate with to access the network.

Provisioning information specific to the network device may be generated by the handheld device, or it may be generated at the cloud computing environment. The provisioning information may be specific to the network device, and may incorporate the network information that the device will be connected to. For example, generating provisioning information specific to the network device may include generating the provisioning information in the cloud computing environment and transferring it to the handheld computing device.

In general, a handheld computing device may be any appropriate (typically mobile) device, including in particular smartphones, pads, and laptops devices. These devices may be capable of communicating both wirelessly (e.g., via Bluetooth, etc.) and by a telecommunications network (e.g., using a 4G/3G/GSM/EVDO network). For example, the handheld computing device may be a smartphone.

The bridging devices described herein may be any appropriate device, but may typically include devices configured to form an ad hoc network that can be wirelessly accessed by the mobile telecommunications device, as well as capable of connecting directly to the network device (e.g., the new device to be provisioned). For example, a bridging device may include an Ethernet port for connecting directly to the network device, as well as a communications module (e.g., wireless communications module, Bluetooth, etc.) that include a predetermined generic IP address. The IP address may be used to identify the ad hoc network with the mobile computing device and provide information and access between the mobile computing device and the network device.

In any of the methods described herein, the bridging device may be attached to the network device by a physical connection, e.g., the bridging device and the network device may be connected by an Ethernet connection. Attaching the bridging device to the network device may include forming an ad hoc network with the bridging device.

In any of the methods described herein, the handheld computing device may wirelessly identify and connect to the bridging device. Wirelessly transmitting information about the network device may include transmitting one or more of: a device model identifier, operational frequency, and operational bandwidth. For example, the network device may transmit an identifier that identifies the particular make and/or model of the networks device; either or both the handheld computing device and the cloud computing environment may include a look-up table identifying the characteristics (e.g., operational characteristics) of a number of network devices. Alternatively or additionally the network device may transmit one or more of these characteristics.

In any of these devices, the geographic location of the network apparatus may be transmitted to the cloud computing device as part of the process described herein. Geographic information may be automatically determined, based on information provided by the network device and/or by the handheld computing device. For example, GPS information may be provided by either or both the network device and the handheld computing device. For example, in any of these methods, the handheld computing device may transmit geographic location information from the handheld computing device to the cloud computing environment. This information may be used, for example, in determining what networks are nearby (and therefore the network device may be provisioned to connect to), and/or may be associated with a geographic databased including the location of the new network apparatus in the available networks. Thus, in any of these methods, the cloud computing environment may associate the geographic location information with the network device.

As described above, in telecommunications or within a typical enterprise environment, a device oftentimes needs to be provisioned prior to providing services to the device. Provisioning the device can involve adding the device to the network's list of allowable devices, and storing a digital certificate in the device. However, in practice, provisioning a new device can be cumbersome and time consuming. For example, during typical device provisioning, a network administrator needs to manually type the device's unique identifiers (e.g., a media access control (MAC) address) into a device-provisioning system. If the network administrator mistypes a portion of the unique identifier, the device will fail to join the network.

To make matters worse, a user that has physical access to the device may not always be the network administrator that controls the device-provisioning system. This is particularly true with Internet service providers (ISPs), where a user has to call the ISP to provision the device, and reads the device's MAC address to the ISP's representative over the phone. Unfortunately, this process can be time consuming, as the user is typically placed on hold until a representative is available to take the user's call.

Embodiments of the present disclosure solve the problem of provisioning a network device to operate within a device site (e.g., a logical networking environment), without having to manually enter configuration information into the network device itself, or into a provisioning system for the device site. For example, the user can use a device-provisioning application on a portable device (e.g., a smartphone) to capture an image of an optical code affixed onto the device. The mobile application can decode the optical code to obtain a unique identifier for the device, as well as other security-related information. As discussed above in part I, this may be helpful for authentication as well as provisioning (see, e.g., FIGS. 2B-2C). This optical code can exist as any pattern that encodes information, such as a linear barcode (e.g., a barcode), two-dimensional (matrix) barcode (e.g., a quick response (QR) code), or any other data-encoding pattern.

After decoding this information from the optical code, the device-provisioning application can provide this information to a network's server that enables services for the device. The device-provisioning application can also use the decoded information to interact with the device, for example, to configure the device to utilize a given computer network (e.g., a Wi-Fi access point). Hence, the device-provisioning application can automate complicated device-provisioning operations, by only requiring the user to capture an image of an optical code that is affixed to the device that is to be provisioned.

Figure 8:
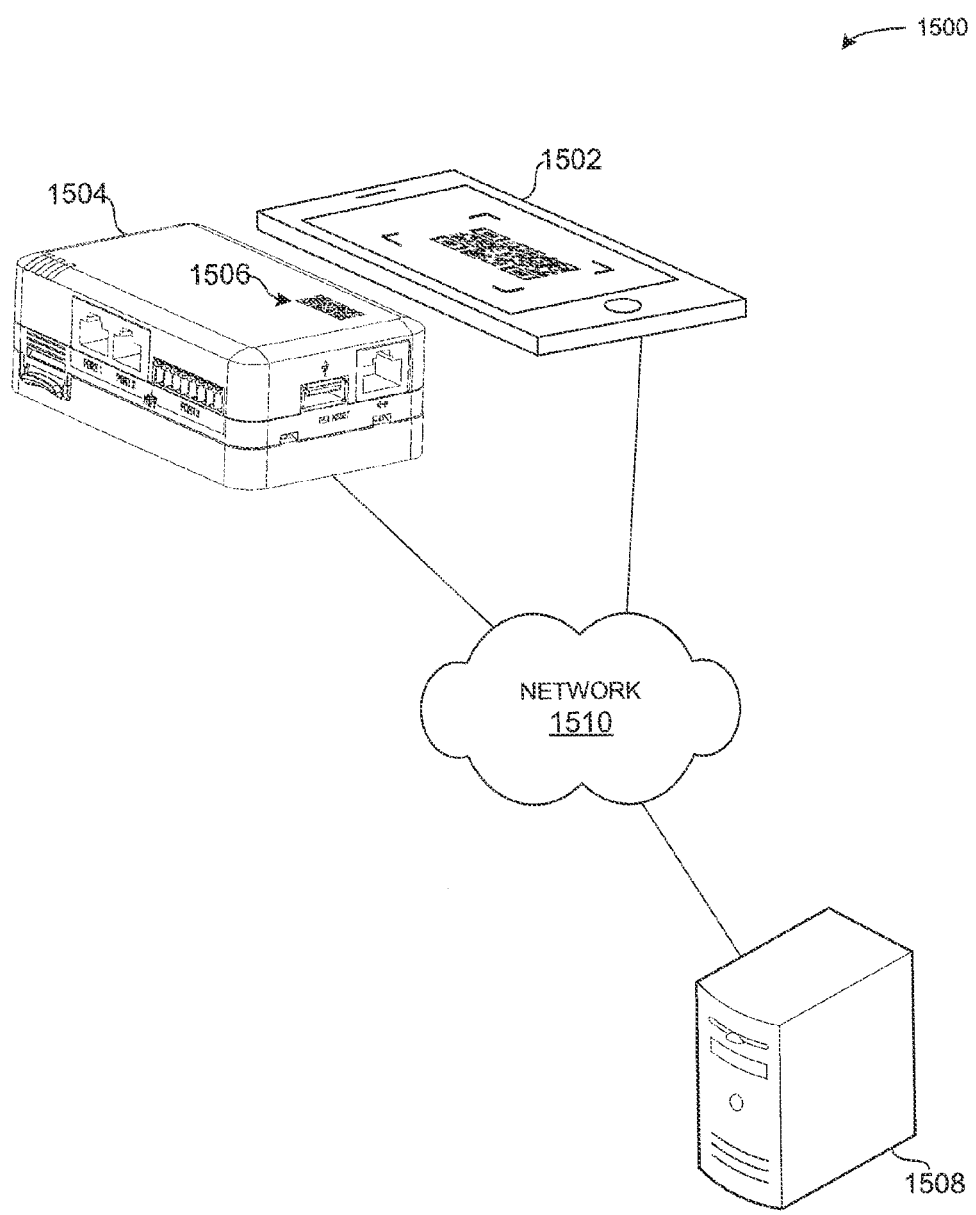
FIG. 8 illustrates an exemplary computing environment that facilitates using a mobile device to provision a network device in accordance with an embodiment.

FIG. 8 illustrates one embodiment of a computing environment 1500 that facilitates using a mobile device 1502 to provision a network device 1504 in accordance with an embodiment. Mobile device 1502 can include any device that includes or interfaces with an image sensor capable of capturing an image of an optical code 1506. For example, mobile device 1502 can include a stand-alone computing device, including, but not limited to a smartphone, a tablet computer, a personal digital assistant (PDA), or a laptop computer.

Mobile device 1502 can run a software application that provisions network device 1504 by scanning optical code 1506 that is affixed to network device 1504, and interfaces with a device-provisioning server 1508 over a network 1510 to provision network device 1504. The software application can include a native software application stored in mobile device 1502, or can include a web-based application accessible from a web server (e.g., a web page hosted by device-provisioning server 1508).

Network device 1504 can include any network-enabled device that is to operate within a secure network, or that is to interface with other secure devices over an insecure network. For example, device 1504 can include a sensor-interfacing device, a network-enabled appliance, a power outlet, a light switch, a thermostat, or a computing device. Further, device 1502 can provision network device 1504 to operate within a given computer network (e.g., a network domain), or to operate within a device "site." The device site realizes a logical network environment, which can include a collection of network devices which are deployed over one or more computer networks, and are grouped to interoperate with other devices of the device site over network 1510.

Network 1510 can generally include any type of wired and/or wireless communication channel capable of coupling together computing nodes. Network 1510 includes, but is not limited to a local area network, a wide area network, a private network, a public network, or a combination of networks. In addition, network 1510 can include a wired network, a wireless network, or a combination thereof. In some embodiments, network 1510 includes an IP-based network. In a further embodiment, network 1510 includes the Internet.

In some embodiments, a site's provisioned devices are each assigned a digital certificate, which is used to authenticate the device's communication when interfacing with other devices of a common device site. This is especially important when a site spans multiple distributed LANs, to prevent unauthorized devices from interfacing with the site's other devices. This also prevents a person from compromising an organization's security from within network 1510. For example, to assign a digital certificate to network device 1504, mobile device 1502 can communicate the information encoded in optical code 1506 to device-provisioning server 1508, at which point device-provisioning server 1508 generates the digital certificate. Network device 1504 may then receive the digital certificate from mobile device 1502, or directly from device-provisioning server 1508.

Figure 9:
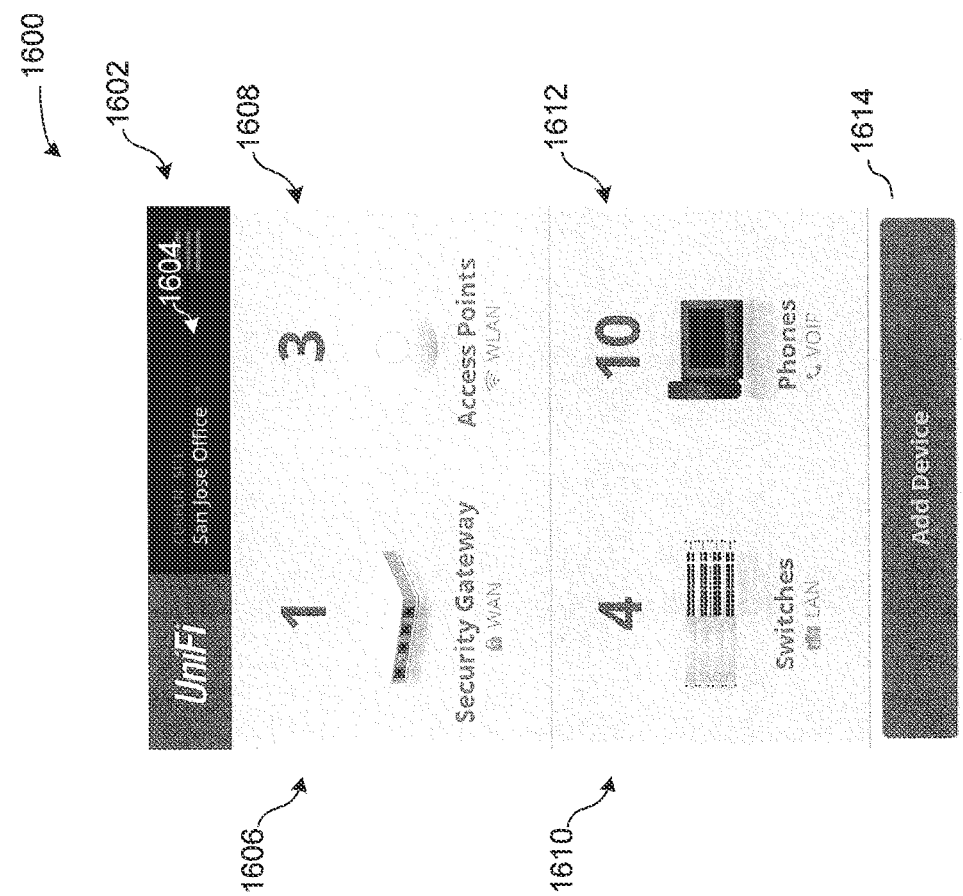
FIG. 9 illustrates a user interface for provisioning a network device in accordance with an embodiment.

FIG. 9 illustrates a user interface 1600 for provisioning a network device in accordance with an embodiment. The user interface can be implemented on a system, e.g., a computing device as described in the present disclosure. UI 1600 can include a top menu bar that presents an options-revealing button 1602, and a site-listing menu handle 1604. The user can tap on (or otherwise select) options-revealing button 1602 to reveal a set of application-related options. These options can allow the user to log out, can provide technical support to the user, and/or can display a set of site-related or provisioning-related notifications to the user.

Site-listing menu handle 1604 can display the name of the currently-selected site (labeled as "current site"), and displays an icon which indicates that pressing on handle 1604 reveals a site listing. The icon can include a down-pointing triangle, a down-pointing arrow, or any other image which hints that a listing can be revealed by tapping on the icon. When the user taps on site-listing menu handle 1604, the UI can be updated to reveal a listing of "other sites." If the user selects one of these other sites (e.g., by tapping on a portion of the screen displaying the site name), the system uses the selected site as the "current site."

UI 1600 can also include various UI segments which each provide a certain type of information about the selected site. In some embodiments, a UI segment can indicate a tally of a number of devices that have been provisioned to operate in the selected "site." For example, the UI segments can include a gateway-tally segment 1606 for displaying a tally of provisioned security gateways, and an AP-tally segment 1608 for displaying a tally of provisioned access points. These UI segments can also include a switch-tally segment 1610 for displaying a tally of provisioned network switches, and a phone-tally segment 1612 for displaying a tally of provisioned IP phones. Other types of UI segments are also possible, such as a segment for displaying a number of active devices (e.g., of a given device type), a number of down devices (e.g., unreachable, or disabled devices), a network throughput for a given device type (e.g., a current throughput, or an aggregate throughput for a certain time window), etc.

Moreover, UI 1600 can also include an "add device" button 1614 for adding a device to the current device site. For example, when the user selects button 1614, the system can present a user interface for capturing an image of an optical code. The system can use the captured image to decode the optical code, and to provision a device based on the optical code's encoded information.

Figure 10:
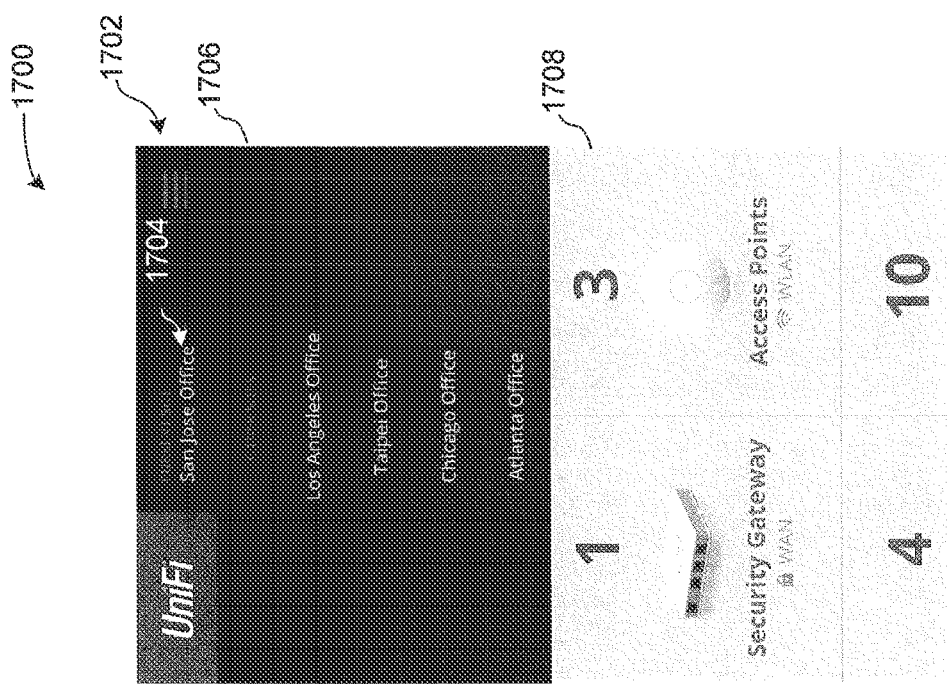
FIG. 10 illustrates a user interface for selecting a device site onto which network devices are provisioned in accordance with an embodiment.

FIG. 10 illustrates a user interface 1700 for selecting a device site in accordance with an embodiment. The user interface can be implemented on a system, e.g., a computing device as described in the present disclosure. UI 1700 displays an options-revealing button 1702, a site-listing menu handle 1704, and displays UI segments 1708. When the user taps on options-revealing button 1702, UI 1700 reveals an options menu from a predetermined edge of UI 1700 (e.g., from a right edge of the display screen).

Also, when the user taps on menu handle 1704, UI 1700 reveals a site listing 1706 of "other sites." In some embodiments, UI 1700 reveals site listing 1706 by presenting an animation which slides down UI segments 1708 until site listing 1706 is revealed, or until UI segments 1708 reaches a predetermined position along UI 1700 (e.g., until UI segments 1708 is not visible in UI 1700). The animation can slide down UI segments 1708 at a predetermined rate (e.g., measured in pixels per second or inches per second), or over a predetermined time interval (e.g., 0.5 seconds). Also, the system can smoothen the animation, for example by ramping up the sliding rate at the start of the animation, and/or by ramping-down the sliding rate toward the end of the animation. If site listing 1706 does not reveal the full list of "other sites" after it is revealed, UI 1700 allows the user to scroll site listing 1706 to reveal other unexposed site names.

Figure 11:
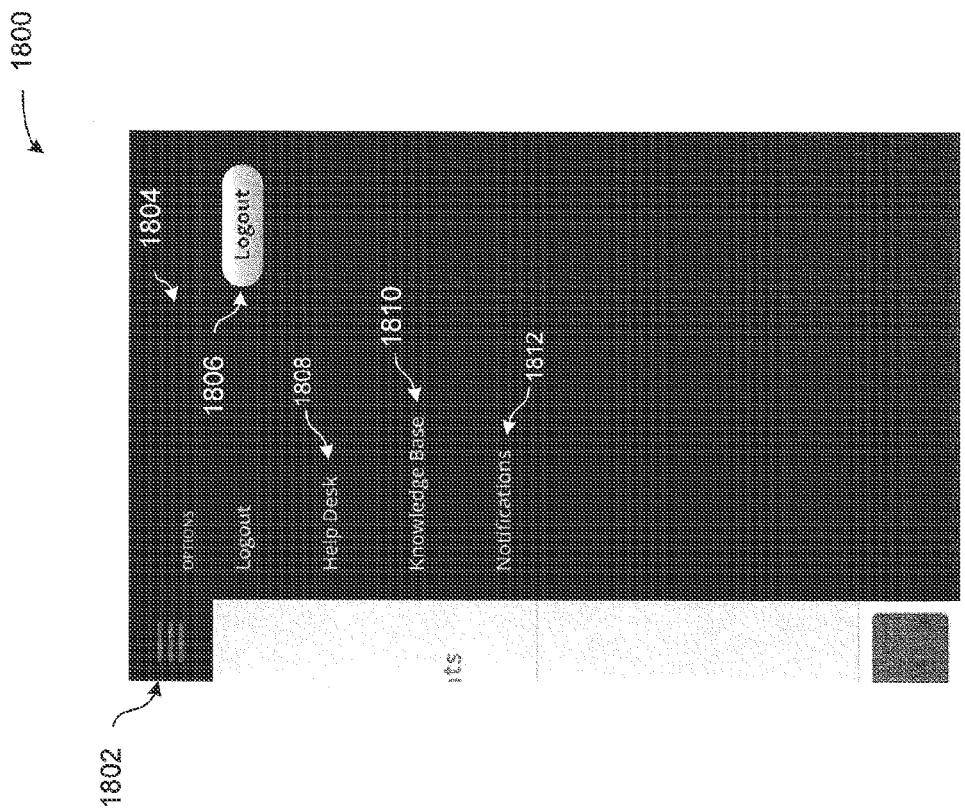
FIG. 11 illustrates a user interface for providing various service-related options to a user in accordance with an embodiment.

FIG. 11 illustrates a user interface 1800 for providing various service-related options to a user in accordance with an embodiment. The user interface can be implemented on a system, e.g., a computing device as described in the present disclosure. Specifically, UI 1800 can include an options-revealing button 1802, which when pressed by the user, causes the system to present an animation which reveals options menu 1804 (if options menu 1804 is hidden). The animation can reveal options menu 1804 from a predetermined edge of the screen, such as from the right edge of UI 1800. Also, if the user taps on options-revealing button 1802 while options menu 1804 is revealed, the system presents an animation which slides options menu 1804 toward the predetermined edge of the screen to hide options menu 1804. The animation can slide options menu 1804 at a predetermined rate, or over a predetermined time interval.

The system can also reveal options menu 1804 when the system detects that the user has swiped his finger from the predetermined edge of UI 1800 toward the center of UI 1800 (e.g., by swiping from the right edge of the screen). Also, the system can hide options menu 1804 when the system detects that the user has swiped his finger past the predetermined edge of UI 1800 (e.g., by swiping out to the right edge of the screen).

In some embodiments, options menu 1804 can include a logout button 1806 which the user can select to log out of a user account. Once the user is logged out, the system does not display information related to the various device sites associated with the user's account, and does not allow the user to provision other devices onto these sites, until the user logs back in.

Options menu 1804 can also include a help-desk menu item 1808, and a knowledge-base menu item 1810. The user can select help-desk menu item 1808 to ask a specific question, or can select knowledge-base menu item 1810 to view an information forum (e.g., a frequently asked questions (FAQ) forum) or a discussion forum. Options menu 1804 can also include a notifications menu item 1812, which the user can select to reveal notifications regarding devices which have been provisioned onto the selected site, and/or from any of the "other sites."

Recall that the mobile application's user interface provides an "Add Device" button that allows a user to add a new device to a desired device site (e.g., using button 1614 of UI 1600). When the user presses the "Add Device" button, the system presents an image-capture user interface that allows the user to capture an optical code affixed to a network device. Once an acceptable optical code is captured, the system can provision the network device using the optical code.

Figure 12:
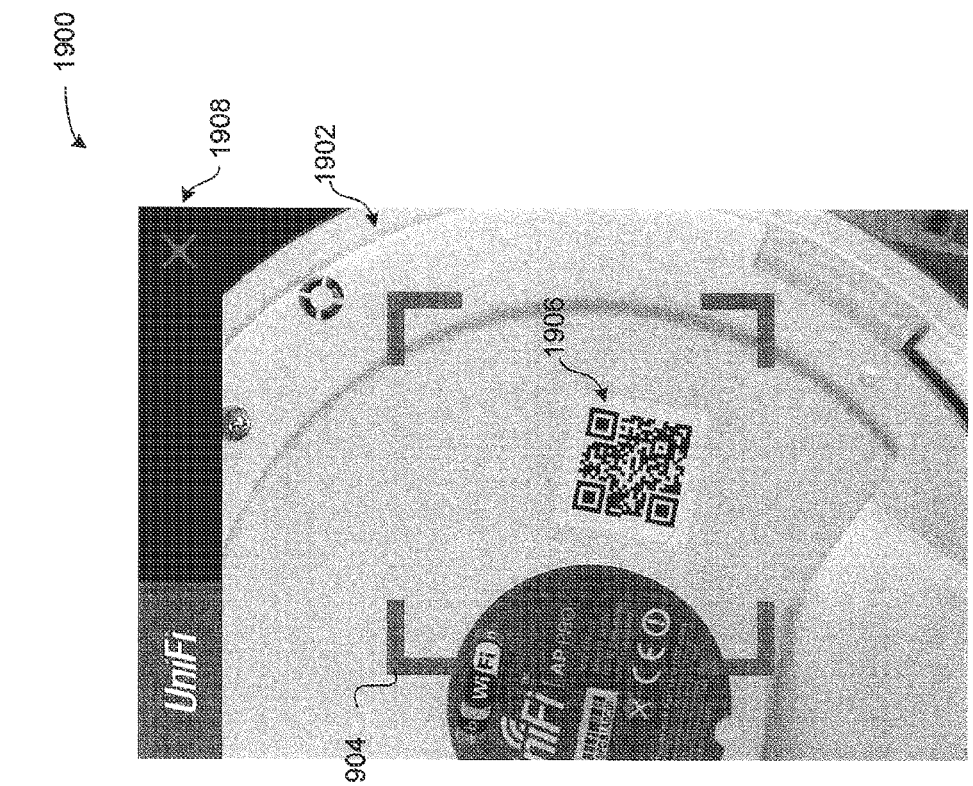
FIG. 12 illustrates a user interface for capturing an optical code in accordance with an embodiment.

FIG. 12 illustrates a user interface 1900 for capturing an optical code in accordance with an embodiment. The user interface can be implemented on a system, e.g., a computing device as described in the present disclosure. UI 1900 includes a viewfinder 1902, which displays images captured by the portable device's built-in camera to make it easier for the user to aim the camera toward an optical code 1906. UI 1900 also includes a cancel button 1908, which the user can use to return to the main user interface at any time (e.g., UI 1600 of FIG. 9).

In some embodiments, the system presents the UI 1900 by sliding viewfinder 1902 into view from a predetermined edge of the display screen (e.g., from the bottom of the display screen). Also, once the system captures or decodes an optical code, or if the user taps on cancel button 1908, the system can hide UI 1900 by sliding viewfinder 1902 out of view toward the predetermined edge of the display screen, or toward any other edge (e.g., an edge opposite the predetermined edge).

UI 1900 can also include a frame overlay 1904 that provides a guide to the user while the user is aiming the mobile device's image sensor toward the optical code. Frame overlay indicates a portion of viewfinder 1902 from which the system reads the optical code. In some embodiments, the system captures an image when it detects that the user has tapped anywhere on viewfinder 1902. The system should be able to decode optical code 1906 if the user properly orients the camera so that optical code 1906 is within frame overlay 1904, and the captured image is sufficiently sharp. If the system is not able to decode optical code 1906, the system can inform the user of the error, and can present UI 1900 to the user once again to try capturing optical code 1906 once again.

FIG. 13 presents a flow chart illustrating a method 2000 for provisioning a network device in accordance with an embodiment. During operation, the system (e.g., computing device as described) can present a user interface which shows information related to devices deployed in one or more device sites, and which allows a user to add a network device to a device site (operation 2002).

In some embodiments, the system can receive a UI event for adding a new network device to a site, such as when the user presses on an "add device" button (operation 2004). To add the device to a site, the system determines a device site onto which the user desires to add the new device (operation 2006), and captures an image of an optical code affixed to the device (operation 2008). Determining a device site may involve, e.g., what is disclosed in connection with FIG. 14 below. The system can capture the optical code's image by presenting an image-capture UI which the user can use to aim the mobile device's camera toward the optical code on the device. Once the user has aimed the camera toward the optical code, the user can tap on the screen (or tap on a camera icon displayed on the screen) to cause the device-provisioning app to capture the optical code's image.

The system then analyzes the optical code to determine whether the optical code is valid (operation 2010). If the optical code is valid, the device-provisioning application (and/or a device-provisioning server associated with the selected device site) adds the network device to the selected device site (operation 2012). Analysis of the optical code and adding the network device may involve, e.g., what is disclosed in connection with FIG. 15 and FIG. 16 below. On the other hand, if the optical code is not valid, the device-provisioning application notifies the user of the failed attempt (operation 2014), such as by informing the user that the optical code is not valid, and/or providing an explanation as to why the optical code is not valid.

In some embodiments, the system can determine whether the user wants to try capturing the optical code again (operation 2016), for example, by displaying a modal window which lets the user choose whether to try again. If the user desires to try again, the device-provisioning application can return to operation 2008 to capture another image of the optical code.

FIG. 14 presents a flow chart illustrating a method 2100 for selecting a device site for provisioning a network device in accordance with an embodiment. During operation, the device-provisioning application can select a previously-selected device site (operation 2102). The previously-selected site may correspond to the last device site onto which the user added a device, the last site monitored by the user via the mobile application, or may correspond to a site which the user has previously designated to be a "default" site. The application can present this site to the user, and can present a site-selecting icon, which when tapped on or otherwise selected by the user, allows the user to select a site from a predetermined list of sites.

In some embodiments, the device-provisioning application determines whether the user desires to select a different site (operation 2104), for example, by determining whether the user has selected the site-selecting icon. If so, the application can present one or more existing device sites (e.g., from a predetermined list of known device sites) (operation 2106), and can receive a user selection for a device site (operation 2108). The application then updates the site-configuring UI to display the user-selected device site (operation 2110). The updated site-configuring UI can display information on its configuration (e.g., a tally for various types of provisioned devices), and can allow the user to provision a new device to the user-selected site.

FIG. 15 presents a flow chart illustrating a method 2200 for processing an optical code in accordance with an embodiment. During operation, the system (e.g., computing device as described) processes the optical code to decode its encoded contents (operation 2202), and determines whether the optical code is legible (operation 2204). If the optical code is not legible, the system notifies the user that the optical code was not captured correctly (operation 2206), and can refrain from provisioning the device. Otherwise, the system proceeds to decode a device identifier from the optical code (operation 2208).

The system then determines whether the device identifier is valid (operation 2210). In some embodiments, the device identifier may not be valid if it does not uniquely identify an existing device (e.g., a device with such an identifier does not exist), or does not identify a device within a device white list (e.g., devices known to have been purchased by a certain organization). If the device identifier is not valid, the system can notify the user that the optical code is not valid (operation 2212), and can refrain from provisioning the device.

On the other hand, if the device identifier is valid, the system accepts the optical code (operation 2214), and can proceed to provision the identified device.

FIG. 16 presents a flow chart illustrating a method 2300 for configuring a network device to a device site, based on information decoded from an optical code in accordance with an embodiment. During operation, the system (e.g., computing device as described) decodes a device identifier, and a secret string from the optical code (operation 2302) of a network device. The device identifier can correspond to a media access control (MAC) address, or a universally-unique identifier (uuid) assigned by the manufacturer or a provisioning entity (e.g., an administrator for an enterprise environment), or any other unique identifier. The secret string can include a service set identifier (SSID) for an unprovisioned network device's default access point, a password (e.g., for accessing a device's access point via a default SSID), or any other secret that can be used to prove physical possession of a network device and/or to provision the network device.

As mentioned above, network devices can include a wireless radio for accessing wireless networks. In some embodiments, an unprovisioned network device can also use the wireless radio to provide a wireless access point for configuring the device. This access point can have a pre-determined service set identification (SSID) value that is used by any unprovisioned device, or can have an SSID value that is unique to that device. If the SSID value is unique to the device, the system can obtain this SSID value from the optical code. The system can also obtain the access point's password from the decoded secret string.

The system then accesses the network device using the device identifier and the secret string to prove physical possession of the device (operation 2304). While accessing the device's access point, the system configures the network device to access a certain computer network (e.g., via another access point), and to belong to a selected site (operation 2306). The system can configure the network device to belong to (and operate as a member of) the selected site, for example, by uploading a digital certificate to the network device that authenticates the network device's membership to the selected site.

Figure 17:
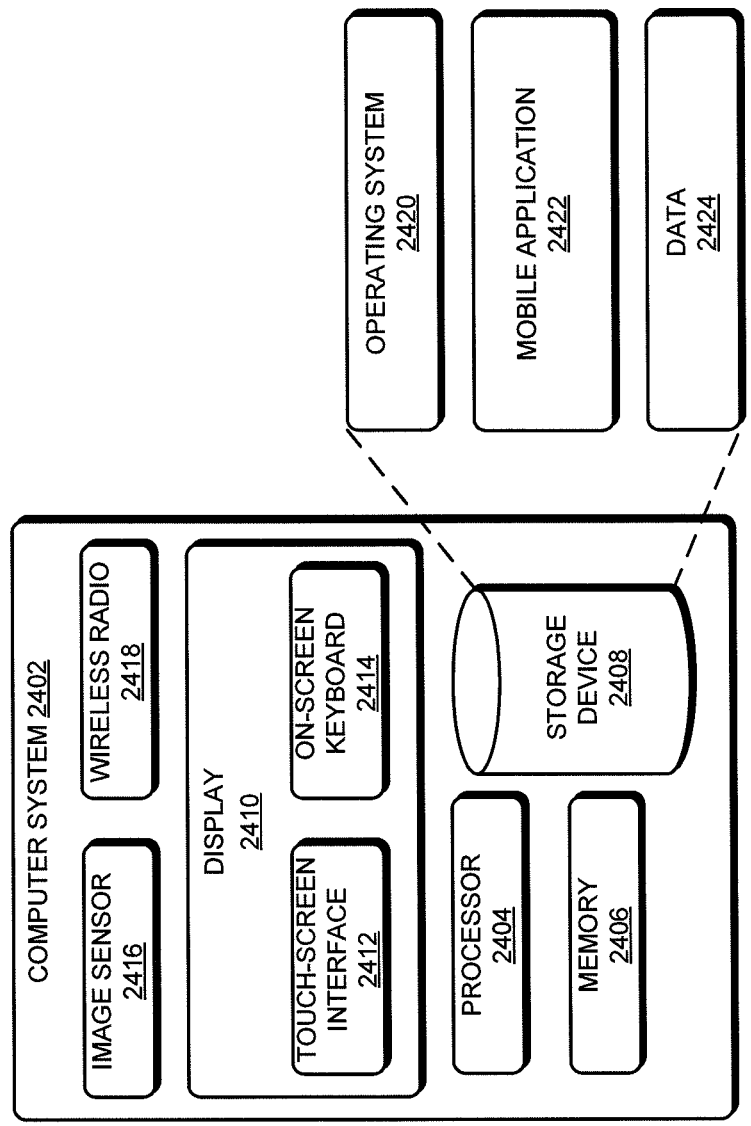
FIG. 17 illustrates an exemplary computer system that facilitates provisioning a network device in accordance with an embodiment.

FIG. 17 illustrates one embodiment of a computer system (e.g., a handheld computing device) 2402 that facilitates provisioning a network device in accordance with an embodiment. Computer system 2402 includes a processor 2404, a memory 2406, a storage device 2408, and a display 2410. Memory 2406 can include a volatile memory (e.g., RAM) that serves as a managed memory, and can be used to store one or more memory pools. Display 2410 can include a touchscreen interface 2412, and can be used to display an on-screen keyboard 2414. Storage device 2408 can store operating system 2420, a mobile application 2422 for provisioning network devices, and data 2424.

Data 2424 can include any data that is required as input or that is generated as output by the methods and/or processes described in this disclosure. Specifically, data 2424 can include information regarding one or more device "sites," and information regarding provisioned devices for these device sites. Data 2424 can also include authorization information for a local user, such as credentials which allow the local user to view and/or modify the configurations to these device sites.

Computer system 2402 can also include an image sensor 2416 and a wireless radio 2418. In some embodiments, mobile application 2422 can use image sensor 2416 to capture an image of an optical code affixed to a network device, and decodes the optical code to provision the device based on the decoded information. Also, mobile application 2422 can use wireless radio 2418 to interface with the network device to prove physical possession of the network device, and/or to configure the network device to operate as a member of a desired "site." For example, wireless radio 2418 can include a Wi-Fi module, and mobile application 2422 can use the optical code's decoded information (e.g., an SSID and/or password) to gain access to an access point hosted by the network device. By gaining access to the network device's access point using the decoded information, mobile application 2422 proves that the user is in physical possession of the network device. Also, while interfacing with the network device, mobile application 2422 can configure the network device to access a local wireless network, to assign a "site" to the device, and/or to perform other device configurations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

EXAMPLE

In some examples a wireless network may be set up or modified so that it can be monitored and/or modified by a cloud computing system (e.g., cloud system). A cloud system may be connected to multiple networks, including all or some of the devices (e.g., APs, CPEs, etc.) in the networks, and may regularly receive information about the identity, location, and/or performance of individual components and of the network(s) linked to the cloud computing environment. For example, a cloud computing environment that may be used to monitor, manage, and/or regulate one or more (including multiple portion of) wireless networks may be referred to for convenience in this example as an "airOS cloud" system. In this example, all of the devices communicating directly with the airOS cloud system may run an operating system that is compatible with the airOS cloud system, so that the two can effectively communicate. The communication with the airOS cloud system may be made when a device is installed for a first time, or it may be made as a modification (e.g., upgrade) to an existing network.

Thus, in some variations, it may be important to provision some or all of the network device communicating with the airOS cloud system so that they may operate effectively within the airOS cloud computing environment (e.g., sending information, including "pulse" information to and from the remote server, and receiving instructions from the remote server, and/or configuring all of some of the devices for efficient operation of the network(s) in communication with the airOS system).

Thus in some variations, in order to be compatible with "airOS Cloud", network devices may be running a version of an operating system (or client software/firmware) that allows communication and/or control with the airOS system. Thus, in some variations, as part of the provisioning process, any devices not using this firmware must be upgraded in order for provisioning to be successful.

Provisioning in such an example may be performed as described above, and may include any of the authentication methods and apparatuses described. For example, in some variations, when a new or existing network device is added to a network that is to communicate with the airOS system (or any other cloud computing system) a discovery tool may be used to detect the network device that needs to be provisioned to communicate with the cloud. For example, when an installer connects a new piece of equipment (network device) to a network, a discovery tool may be used to identify the unprovisioned device and instigate provisioning. In some variations, a device may be added to cloud environment via a discovery tool. For example, a discovery tool may be software, firmware and/or hardware that (e.g., may run on a computing device) allows a user to select one or multiple devices for adding to the network and the cloud computing environment. For example, the discovery tool may allow the user to enter cloud login information, and select one or more organization and site. This may be particularly important as the cloud may be used and shared by multiple organizations (e.g., having multiple networks) and these networks may overlap and/or be separate. As new devices (network devices) are added, they may be verified, immediately and provisioned immediately or later. For example, devices may be added for later provisioning; upon launching the cloud environment, e.g., airOS Cloud, an awaiting notification asks the provisioning party to accept [X] number of new devices that have been discovered on [NETWORK NAME].

In some variations the device may be initially validated (e.g., approved). Once approved, all network devices may appear in Identified/Unplaced Device List under the detected network: [NETWORK NAME]. They may be later provisioned, e.g., by the proper network administrator.

In some variation, the system may self-discover and/or auto-provision devices as they are added (or as the network already connecting to the devices are added) to the cloud system. For example, an installer may connect new equipment to network. A network device may be added to the cloud via built-in firmware "Discovery" & Proxy; upon launching the cloud system (e.g., airOS), the user may see an awaiting notification asking the provisioning party to accept [X] number of new devices that have been discovered on [NETWORK NAME]. Once approved, all devices appear in Identified/Unplaced Device List under the detected network: [NETWORK NAME].

In some variations, method of manually provisioning from a network device may be used. For example, installation may not necessarily be required, but a network device may have to have internet access to authenticate. For example, a provisioning party (user) may launch the cloud (e.g., airOS) system on a smartphone, tablet, or desktop. In some variations, the cloud system may be an embedded web interface locally on the device. An interface may be the same on smartphone, tablet, or desktop.

In some variations, the user may enter the cloud (e.g., airOS Cloud) login information and organization and/or the site into device Web UI. Thus, the device (network device) must have access to internet; in some variations the device does not have (or does not have full) internet access until after provisioning. The new network devices may appear in an identified/unplaced device list.

In any of these variations, as described above, provisioning (and/or authentication) may be performed using a code (such as a QR code). For example, installation may not be required prior to provisioning, it may be completed prior or post to the provisioning process. For example, a provisioning party may launch the cloud (e.g., airOS cloud) client on a smartphone or tablet. The user may select an organization and location as described above. In some variations the apparatus (e.g., tool) may include a built-in scanner (e.g., QR scanner, ultrasound scanner, etc.) and can scan the new device. The device may then be automatically added to the identified/unplaced device list.

As referenced above, any of the methods and apparatuses described herein may be used for the mass importing of devices/mass provisioning (and/or mass authentication) of devices, such as network devices. For example, a cloud system (e.g., airOS Cloud) may allow migration of multiple devices (e.g., network devices) in a single batch. For example, a user may enters their cloud login info, organization, and/or location, and migrate all or some of the existing devices on their existing network or list (e.g., list of previously authenticated) of devices. For example, devices may appear in an "unplaced" list. These devices may be provisioned as a batch.

In any of these variations, the cloud system may know or infer geographical location information. Thus, for example, any of these systems may also communicate this information to/from the cloud, so that it is automatically placed on geographical map, which may also include additional information (e.g., signal-strength, interference, device-specific information, etc.).

Thus, any of the methods and apparatuses described herein may allow a user to provision wirelessly from a computing device such as a smartphone running a mobile application ("app") that allows authentication and/or provisioning and/or adding to the cloud server, as described above. For example, a mobile application may scan for nearby devices (network devices) and may select devices to provision. The app may include software, firmware and/or hardware in a non-transient medium that allows it regulate authentication and/or provisioning and/or connecting to the cloud. For example, an app may connect to a network device, and add each device to the cloud account (after or prior to authenticating) for immediate or later provisioning. For example in some variations, device may appear in an unplaced device list; if the device is placed or configured with the app, the app may automatically update the device's configuration provided by cloud (e.g., provisioning or partially provisioning the device). The app may also help collect GPS coordinates to geographically place network devices on a map maintained by the app and/or the cloud.

Manual techniques for adding (including authenticating and/or provisioning) devices may also be described. For example one or more network devices may be added to a cloud environment (e.g., airOS Cloud). For example, from airOS Cloud, a device's unique ID (e.g., MAC address) may be manually added to the cloud, and if this unique ID (e.g., MAC) shows up in unplaced devices when communicating (even in a limited manner) with the cloud, the cloud may request/require authentication and/or provisioning of the apparatus.

For example, an installer may add an additional backhaul and 6 APs to an existing network to support a new customer base, and this network may be coupled to the cloud server, allowing monitoring and/or control of the network(s) by the cloud, including through a cloud interface. The installer may order the equipment, which may arrive at a main office and be provisioned (e.g., QR scan) prior to actual on-site installation. Thereafter, the installer may pick up the new equipment for the backhaul and AP installation in the field. Thus, the devices may be pre-approved (authenticated) at the office, but installed in the field at an installation location. The provisioning may be done partially or completely before field installation and the devices placed on a cloud-based "trusted" list for updating (e.g., location) once installed. Alternatively or additionally, the devices maybe authenticated (for the first time or a second time) at the installation site.

In another example, an installer may have a mobile device (computing device) for use in the field; if the device runs out of battery or is otherwise unavailable, the installer may provision the equipment post-installation. On a desktop computer the installer may launch the cloud system interface (e.g., airOS) and be notified of that all or some of the new devices installed are ready for provisioning.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all subranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of automatic and hands-free provisioning a network device to communicate with a network, the method comprising:
    attaching a bridging device to the network device;
    wirelessly transmitting information about the network device from the bridging device to the handheld computing device;
    transmitting an identifier of a second network and the information about the network device from the handheld computing device to a cloud computing environment;
    transmitting provisioning information from the handheld computing device to the network device;
    provisioning the network device with the provisioning information; and
    removing the bridging device from the network device, wherein the network device is configured to communicate with the cloud computing environment through the selected second network directly.

2. The method of claim 1, further comprising selecting the identified second network from a list of networks on the handheld computing device before transmitting the identifier of the selected second network.

3. The method of claim 1, further comprising generating provisioning information specific to the network device.

4. The method of claim 1, further comprising attaching the bridging device wherein the bridging device and the network device are connected by an Ethernet connection.

5. The method of claim 1, wherein generating provisioning information specific to the network device comprises generating the provisioning information in the cloud computing environment and transferring it to the handheld computing device.

6. The method of claim 1, wherein the handheld computing device is a smartphone.

7. The method of claim 1, wherein attaching the bridging device to the network device comprising forming an ad hoc network with the bridging device.

8. The method of claim 1, further comprising wirelessly identifying and connecting to the bridging device with the handheld computing device.

9. The method of claim 1, wherein wirelessly transmitting information about the network device comprises transmitting one or more of: a device model identifier, operational frequency, and operational bandwidth.

10. The method of claim 1, further comprising transmitting geographic location information from the handheld computing device to the cloud computing environment, and associating the geographic location information with the network device in the cloud computing environment.

11. A method of automatic and hands-free provisioning a network device to communicate with a network, the method comprising:
    attaching a bridging device to the network device, wherein the bridging device forms an ad hoc network wirelessly connecting the bridging device and a handheld computing device;
    wirelessly transmitting information about the network device to the handheld computing device;
    identifying a second network on the handheld computing device;
    transmitting an identifier of the second network and the information about the network device from the handheld computing device to a cloud computing environment;
    generating provisioning information for the network device;
    transmitting the provisioning information from the handheld computing device to the network device;
    provisioning the network device with the provisioning information;
    connecting the network device to the second network; and
    removing the bridging device from the network device, wherein the network device is configured to communicate with the cloud computing environment through the second network.

12. The method of claim 11, further comprising selecting the identified second network from a list of networks on the handheld computing device before transmitting the identifier of the selected second network.

13. The method of claim 11, further comprising generating provisioning information specific to the network device.

14. The method of claim 11, further comprising attaching the bridging device wherein the bridging device and the network device are connected by an Ethernet connection.

15. The method of claim 11, wherein generating provisioning information specific to the network device comprises generating the provisioning information in the cloud computing environment and transferring it to the handheld computing device.

16. The method of claim 11, wherein the handheld computing device is a smartphone.

17. The method of claim 11, further comprising wirelessly identifying and connecting to the bridging device with the handheld computing device.

18. The method of claim 11, wherein wirelessly transmitting information about the network device comprises transmitting one or more of: a device model identifier, operational frequency, and operational bandwidth.

19. The method of claim 11, further comprising transmitting geographic location information from the handheld computing device to the cloud computing environment, and associating the geographic location information with the network device in the cloud computing environment.

* * * * *